United States Patent
Jalasutram et al.

(10) Patent No.: US 12,038,997 B2
(45) Date of Patent: Jul. 16, 2024

(54) GENERATING A SNIPPET PACKET BASED ON A SELECTION OF A PORTION OF A WEB PAGE

(71) Applicant: Google LLC, Mountain View, CA (US)

(72) Inventors: Srikanth Jalasutram, San Francisco, CA (US); Wesley Stuurman, Tokyo (JP); Xingyue Chen, Mountain View, CA (US); Naoki Koguro, Tokyo (JP); Ryuichi Hoshi, Tokyo (JP); Xuchao Chen, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/081,814

(22) Filed: Dec. 15, 2022

(65) Prior Publication Data

US 2023/0376555 A1   Nov. 23, 2023

Related U.S. Application Data

(60) Provisional application No. 63/344,783, filed on May 23, 2022.

(51) Int. Cl.
| | |
|---|---|
| *G06F 16/957* | (2019.01) |
| *G06F 3/0481* | (2022.01) |
| *G06F 3/04842* | (2022.01) |
| *G06F 3/0488* | (2022.01) |
| *G06F 9/451* | (2018.01) |
| *G06F 40/134* | (2020.01) |

(52) U.S. Cl.
CPC ........ *G06F 16/9577* (2019.01); *G06F 3/0481* (2013.01); *G06F 3/04842* (2013.01); *G06F 3/0488* (2013.01); *G06F 9/451* (2018.02); *G06F 40/134* (2020.01)

(58) Field of Classification Search
CPC .............. G06F 16/9577; G06F 3/0481; G06F 3/04842; G06F 3/0488; G06F 9/451; G06F 40/134
See application file for complete search history.

(56) References Cited

U.S. PATENT DOCUMENTS

| | | | |
|---|---|---|---|
| 2016/0149956 A1* | 5/2016 | Birnbaum | ............... G06F 21/10 726/1 |
| 2018/0089199 A1 | 3/2018 | Frumkin et al. | |
| 2020/0159373 A1* | 5/2020 | Bakker | ................... G06F 9/543 |

OTHER PUBLICATIONS

International Search Report and Written Opinion for Application No. PCT/US2023/019750, dated Jul. 13, 2023, 13 pages.

* cited by examiner

*Primary Examiner* — Pei Yong Weng
(74) *Attorney, Agent, or Firm* — DORITY & MANNING P.A.

(57) ABSTRACT

Systems and methods for snippet packet generation can include obtaining input data (e.g., input data descriptive of a gesture). The input data can be processed to determine a content item selected by the input. A snippet packet can be generated based on the content item, which can include the content item, address data, and location data. The snippet packet can be configured to be interacted with in order to navigate to the source web page of the content item including navigating to the specific portion of the web page that includes the content item.

18 Claims, 20 Drawing Sheets

GENERATING A SNIPPET PACKET BASED ON A SELECTION OF A PORTION OF A WEB PAGE

RELATED APPLICATIONS

This application claims priority to and the benefit of U.S. Provisional Patent Application No. 63/344,783, filed May 23, 2022. U.S. Provisional Patent Application No. 63/344,783 is hereby incorporated by reference in its entirety.

FIELD

The present disclosure relates generally to generating an interactive snippet packet in response to a user input. More particularly, the present disclosure relates to obtaining a user input to select a content item to save with a snippet packet that can be later selected to provide the portion of the web page that includes the content item.

BACKGROUND

Saving text, images, and/or audio from a web page can allow a user to locally experience the text, images, and/or audio again without having a connection to the internet. However, the saving process can provide limited context to where the data came from, and in the instance that a user wishes to view the context of the saved data, a user has to either use the data as a search query, navigate through their browsing history, or try to remember how they got to the web page in the first place. Additionally, when the web page source is found, the user may still have to review large portions of the web page to find where exactly in the web page the saved data is originally from.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include providing data descriptive of a graphical user interface. The graphical user interface can include a graphical window for displaying a web page. In some implementations, the web page can include a plurality of content items. The operations can include obtaining input data. The input data can include a request to save one or more content items of the plurality of content items. The operations can include generating a snippet packet. In some implementations, the snippet packet can include the one or more content items. The snippet packet can include address data. The address data can be descriptive of a web address for the web page. The snippet packet can include location data. The location data can be descriptive of a location of the one or more content items within the web page. The operations can include storing the snippet packet. The snippet packet can be associated with a particular user.

Another example aspect of the present disclosure is directed to a computer-implemented method. The method can include obtaining, by a computing system including one or more processors, input data. The input data can be descriptive of a selection of a content item associated with a snippet packet. The method can include obtaining, by the computing system, address data and location data associated with the snippet packet. The address data can be associated with a web page. The content item can be associated with the web page. In some implementations, the location data can be descriptive of a location of the content item within the web page. The method can include obtaining, by the computing system, web page data. The web page data can be obtained based at least in part on the address data. The method can include determining, by the computing system, the location within the web page associated with the content item and providing, by the computing system, a portion of the web page. The portion of the web page can include the location of the content item.

Another example aspect of the present disclosure is directed to one or more non-transitory computer-readable media that collectively store instructions that, when executed by one or more computing devices, cause the one or more computing devices to perform operations. The operations can include providing a graphical user interface. The graphical user interface can include a graphical window for displaying a web page. In some implementations, the web page can include a plurality of content items. The operations can include receiving gesture data. In some implementations, the gesture data can be descriptive of a gesture associated with a portion of the web page. The operations can include processing the gesture data to determine a selected content item. The selected content item can be associated with the portion of the web page. The operations can include generating a snippet packet based on the gesture data. In some implementations, the snippet packet can include the selected content item.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
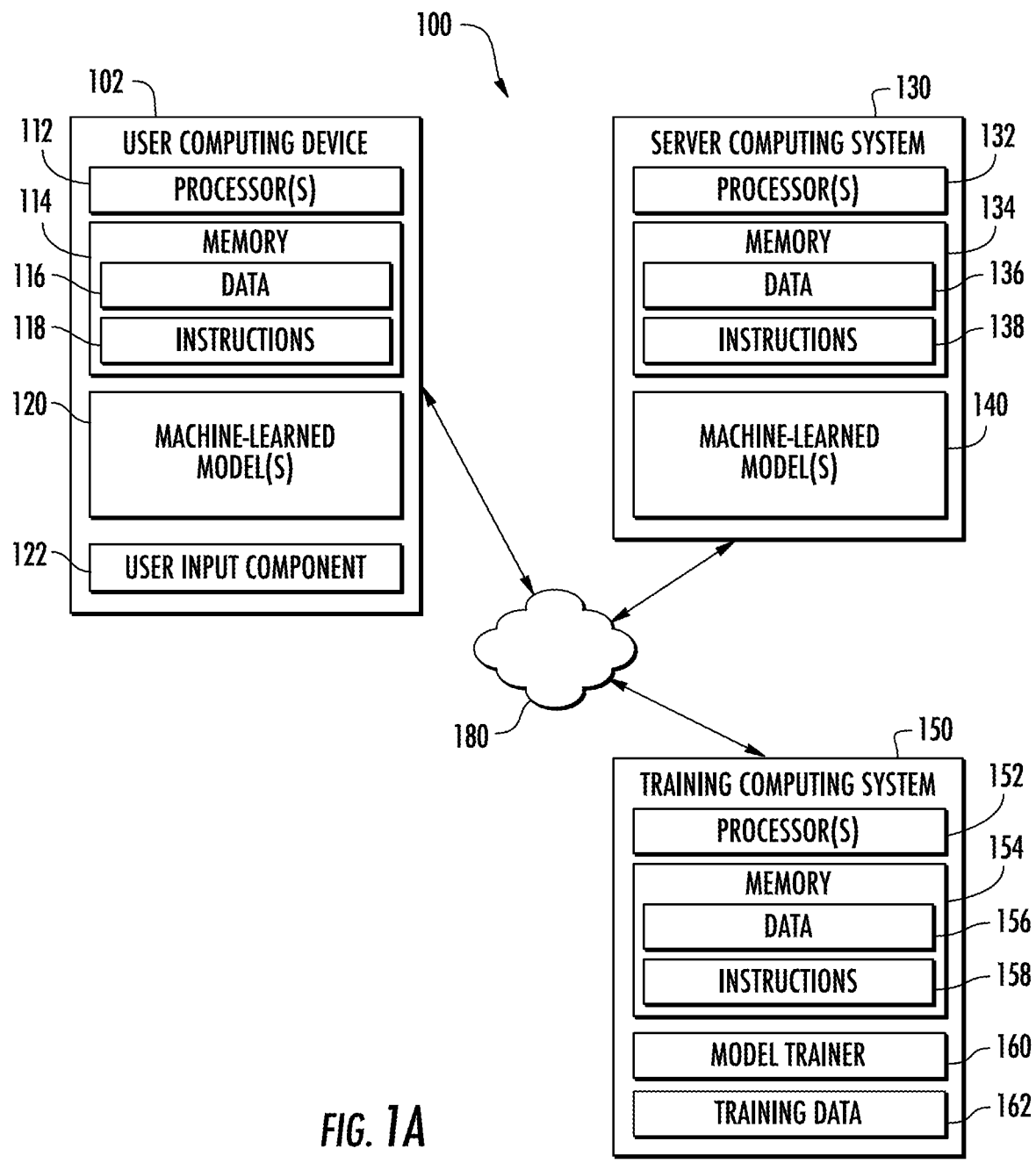
FIG. 1A depicts a block diagram of an example computing system that performs snippet packet generation according to example embodiments of the present disclosure.

Reference numerals that are repeated across plural figures are intended to identify the same features in various implementations.

DETAILED DESCRIPTION

Overview

Generally, the present disclosure is directed to generating an interactive snippet packet in response to a user input. More particularly, the present disclosure relates to obtaining a user input to select a content item to save with a snippet packet that can be later selected to provide the portion of the web page that includes the content item. For example, a user can select a portion of a web page and/or a data file. Data descriptive of the selected portion can then be stored with information associated with the web page/data file and the location of the portion in relation to the web page/data file. The stored dataset can be a snippet packet that includes graphical representation of the selected portion, which can include a graphical card with text and/or images from the selected portion. The snippet packet can be stored for later reference and/or may be shared with other users. The snippet packet can enable a user to view the selected portion then navigate to the particular location of the selected portion in the original web page/data file upon selection. The systems and methods can include providing a graphical user interface. The graphical user interface can include a graphical window for displaying a web page. In some implementations, the web page can include a plurality of content items. The systems and methods can include obtaining input data. The input data can include a request to save one or more content items of the plurality of content items. A snippet packet can be generated. The snippet packet can include the one or more content items, address data, and location data. In some implementations, the address data can be descriptive of a web address for the web page. The location data can be descriptive of a location of the one or more content items within the web page. The snippet packet can be stored in a user database.

For example, the systems and methods disclosed herein can include providing a graphical user interface. The graphical user interface can include a graphical window for displaying a web page. In some implementations, the web page can include a plurality of content items. The displayed web page can include text, one or more images, one or more interactive user interface elements, one or more videos, and/or one or more audio clips. The graphical user interface may be part of a browser application.

The systems and methods can obtain input data. The input data can include a request to save one or more content items of the plurality of content items. In some implementations, the one or more content items can include at least one of an image, a video, a graphical depiction of a product, or audio. The graphical user interface may be updated to include one or more user interface elements for interacting with the one or more content items, which can include saving the one or more content items and may include different options for the formatted save. Alternatively and/or additionally, an overlay interface may provide a pop-up interface in response to the request. The input data may be descriptive of a gesture associated with the one or more content items (e.g., a circle around the one or more content items).

A snippet packet can be generated. The snippet packet can be generated based on the input data. The snippet packet can include the one or more content items, address data, and location data. Generating the snippet packet can include processing the one or more content items with one or more machine-learned models to generate a semantic understanding output that can be utilized for summarization, annotation, and/or classification.

The one or more content items can include text data (e.g., text data descriptive of a word, a sentence, a quote, and/or a paragraph), image data (e.g., an image of an object (e.g., a product)), video data (e.g., a video and/or one or more frames of a video), audio data (e.g., waveform data), and/or latent encoding data. The one or more content items can include multimodal data. The address data can include a resource locator associated with a web page (e.g., a web address) and/or a file address. The location data can be descriptive of where in a web page and/or file that the one or more content items is located. For example, the location data can indicate a start and end of the one or more content items in the web page and/or file.

In some implementations, generating the snippet packet can include obtaining the one or more content items and generating a graphical card. The graphical card can be descriptive of the one or more content items. The graphical card can include text data overlaid over a color and/or an image. The color may be determined based on a predominant color of the web page. In some implementations, the color may be predetermined and/or may be determined based on surrounding content items. The image may be an image determined based on a determined topic of the content item. Alternatively and/or additionally, the image may be an image proximate to the content item. In some implementations, the graphical card can include a font determined based on a font used in the web page. The graphical card can include a background, text descriptive of the content item (e.g., the content item and/or a summarization of the content item), and/or text and/or a logo descriptive of the source and/or a determined entity. In some implementations, the text size for the text in the graphical card can be based on the amount of text in the content item.

The address data can be descriptive of a web address for the web page. The address data can include a uniform resource identifier and/or a uniform resource locator. In some implementations, the address data can include data descriptive of the source of the content item.

The location data can be descriptive of a location of the one or more content items within the web page. In some implementations, the location data can include at least one of a scroll position, a start node, or an end node. The scroll position can be descriptive of the location of the one or more content items in relation to other portions of the web page. In some implementations, the start node can be descriptive of where the one or more content items begin. The end node can be descriptive of where the one or more content items end. The location data can include a text fragment (Tomayac et al., "Scroll to Text Fragment," GITHUB, (May 20, 2022, 9:40 PM) https://github.com/WICG/scroll-to-text-fragment.) that can be utilized to indicate the location of the content item. In some implementations, the text fragment can include one or more text directives associated with the location. The text directive can include a string of code start data (e.g., the first text associated with the content item and/or the first pixels associated with the content item) and/or end data (e.g., the last text associated with the content item and/or the last pixels associated with the content item). The text directive can be utilized to search the web page for a set of data that matches the beginning and/or the end of the content item.

In some implementations, the systems and methods can include processing the one or more content items to determine an entity associated with the one or more content items. An entity tag can be generated based on the entity. The snippet packet can include the entity tag.

The snippet packet can be stored in a user database. In some implementations, storing the snippet packet in the user database can include storing the snippet packet locally on a mobile computing device. Additionally and/or alternatively, the graphical card can be stored as a graphical representation of the snippet packet. The graphical card can be automatically generated and may be customizable by the user. The graphical card can begin with a template that can be customized based on other content in the web page, based on user input, and/or based on other context. In some implementations, the graphical card can include multimodal data. Alternatively and/or additionally, the snippet packet can be stored on a server computing system. In some implementations, if the content item references another content item, then the systems and methods can obtain the additional content item and save the additional content item in the snippet packet.

In some implementations, the systems and methods can include receiving a snippet request to provide a snippet interface. The snippet interface can include an interactive element associated with the snippet packet. The snippet interface can be provided for display. An interface selection can be received, and the interface selection can be descriptive of a selection selecting the interactive element. A portion of the web page can then be provided for display. In some implementations, the portion of the web page can include the location of the one or more content items within the web page.

In some implementations, the systems and methods can include receiving an insertion input. The insertion input can include a user input requesting the insertion of the content item into a different interface. The snippet packet can be provided to a third party server computing system.

Additionally and/or alternatively, the systems and methods can include adding the snippet packet to a collection. The snippet packet can be added to a collection based on received user input. Alternatively and/or additionally, the snippet packet can be added to a collection automatically based on a determined entity associated with the content item. In some implementations, the snippet packet can be added to a collection based on the source of the content item (e.g., the type of web page, a type of media provider, and/or based on the type of content item).

In some implementations, the snippet packet can be generated based on content items obtained from a source other than a web page (e.g., a mobile application, a large data file (e.g., a downloaded video or book), and/or another source of data).

The systems and methods can include providing a particular portion of the web page for display in response to an interaction with the snippet packet. For example, the systems and methods can include obtaining input data. The input data can be descriptive of a selection of a content item associated with a snippet packet. Address data and location data associated with the snippet packet can be obtained. The address data can be associated with a web page. The content item can be associated with the web page. Additionally and/or alternatively, the location data can be descriptive of a location of the content item within the web page. The systems and methods can obtain web page data. The web page data can be obtained based at least in part on the address data. The location within the web page associated with the content item can be determined. A portion of the web page can then be provided. The portion of the web page can include the location of the content item.

The systems and methods can obtain input data. In some implementations, the input data can be descriptive of a selection of a content item associated with a snippet packet. The snippet packet can be associated with a user account of a specific user. Additionally and/or alternatively, the user account can be associated with one or more platforms. The snippet packet can include the content item and a deep link. Alternatively and/or additionally, the snippet packet can include a snippet (e.g., a content item and/or a media data generated based on the content item (e.g., a graphical card and/or a summarization of the content item)), address data (e.g., a uniform resource locator and/or a uniform resource identifier), and/or metadata. The snippet packet can include location data (e.g., metadata indicative of a location of the content item within the web page, a text fragment for identifying start data and end data, one or more pointers, and/or one or more scroll position data).

In some implementations, the snippet packet may be generated by providing a graphical user interface for display.

The graphical user interface can include a graphical window for displaying the web page. In some implementations, the web page can include a plurality of content items. The snippet packet generation can include obtaining selection data. The selection data can include a request to save the content item of the plurality of content items. In some implementations, the snippet packet generation can include generating the snippet packet and storing the snippet packet in a user database.

The systems and methods can obtain address data and location data associated with the snippet packet based on the input data. The address data can be associated with a web page. The content item can be associated with the web page. Additionally and/or alternatively, the location data can be descriptive of a location of the content item within the web page.

Web page data can then be obtained. The web page data can be obtained based at least in part on the address data (e.g., by navigating to the web page using a uniform resource locator). Alternatively and/or additionally, a file may be obtained based on the address data (e.g., the address data can be descriptive of a file location and may be utilized to obtain that specific file).

The location within the web page (and/or a file) associated with the content item can be determined based on the obtained location data. The location may be determined based on a text fragment, one or more pointers, and/or via web page processing.

In some implementations, the address data can include a uniform resource locator. Additionally and/or alternatively, the location data can include one or more text fragments. Determining the location within the web page associated with the content item can then include adding the text fragments to the uniform resource locator to generate a shortcut link and inputting the shortcut link into a browser.

A portion of the web page can then be provided for display. The portion of the web page can include the location of the content item. In some implementations, providing the portion of the web page can include providing one or more indicators with the portion of the web page. The one or more indicators can indicate the content item associated with the snippet packet. In some implementations, the one or more indicators can include highlighting text associated with the content item.

The systems and methods can include processing gesture data. For example, the systems and methods can include providing a graphical user interface. The graphical user interface can include a graphical window for displaying a web page. In some implementations, the web page can include a plurality of content items. The systems and methods can receive gesture data. The gesture data can be descriptive of a gesture associated with a portion of the web page. The gesture data can be processed to determine a selected content item. The selected content item can be associated with the portion of the web page. A snippet packet can be generated based on the gesture data. In some implementations, the snippet packet can include the selected content item.

In particular, a graphical user interface can be provided for display. The graphical user interface can include a graphical window for displaying a web page. In some implementations, the web page can include a plurality of content items. The web page can be associated with a uniform resource locator and/or source code. The plurality of content items can include structured text data (e.g., body paragraphs and/or one or more titles), white space, one or more images, and/or audio content items.

Gesture data can then be received. The gesture data can be descriptive of a gesture associated with a portion of the web page. In some implementations, the gesture can include a circular gesture that encloses the portion of the web page. The gesture data can be descriptive of a touch input to a touchscreen display of a mobile computing device.

The gesture data can be processed to determine a selected content item. The selected content item can be associated with the portion of the web page. For example, the gesture can enclose an image and one or more lines of text in a webpage that includes a plurality of lines and/or a plurality of images.

In some implementations, processing the gesture data to determine the selected content item can include determining the portion of the web page enclosed by the gesture, determining a focal point of the portion, and determining the selected content item is associated with the focal point of the portion.

Alternatively and/or additionally, processing the gesture data to determine the selected content item can include processing the gestured data with a machine-learned model to determine the selected content item. The machine-learned model can be trained to determine a beginning and end of the selected content item based on proximity to the gesture boundary, the syntax, structural data, white space, and/or the semantic cohesion.

In some implementations, the selected content item can be determined based on a determined matched area associated with a rectangle determined based on the circle. The rectangle can be a rectangle of data based on syntactical make-up of the web page. In some implementations, the selected content item can be determined based on a determined word boundary and/or based on a determined media content boundary. The determination may be based on hypertext markup language code boundary. In some implementations, the source code of the web page can be parsed, and the parsed data can be processed.

Alternatively and/or additionally, the determination can include computing the area of a gesture rectangle associated with the gesture. An area of one or more content item elements can be determined. The area of intersection between the area of the gesture rectangle and each of the areas of the different content item elements can be determined. The element with the highest intersection may have the highest probability of selection and can therefore be determined as the selected content item.

A snippet packet can then be generated based on the gesture data. The snippet packet can include the selected content item. In some implementations, the snippet packet can include address data and location data. The address data can be associated with the web page, and the location data may be descriptive of a location of the content item within the web page.

A save interface can then be provided for display. The save interface can provide an interactive interface element that can be selected to add the snippet packet to a collection. A collection interface can then be provided. A drag input can then be received that drags a graphical representation of the snippet packet to a graphical tile descriptive of a particular collection. The snippet packet can then be stored in the collection (e.g., the snippet packet can be stored with a relationship tag that links the snippet packet to the particular collection). In some implementations, the graphical representation of the snippet packet can change sizes and/or proportions when the graphical representation is dragged to the particular collection. The size and proportion changes can provide an intuitive indication of the collection addition while providing an aesthetically pleasing display.

In some implementations, the content item can be processed to determine an entity associated with the content item. The entity can be determined by processing the content item (e.g., the text data, the image data, the audio data, the video data, the latent encoding data, and/or the link data) with a machine-learned model (e.g., an image classification model, an object classification model, a text classification model (e.g., a natural language processing model), a segmentation model, a semantics model, and/or a detection model) to generate entity data (e.g., a classification). Relationship data can then be generated and added to the snippet packet based on the entity data. The relationship data can include one or more entity tags and/or references to other related snippet packets and/or related web pages or content items.

The snippet packets can be searchable within one or more applications and/or databases. Additionally and/or alternatively, the snippet packets may be shareable via messaging applications, social media applications, and/or via another application.

In some implementations, the content item can be processed with one or more machine-learned models to generate tags that can be stored in the snippet packet. The tags can then be utilized as searchable tags to surface the snippet packet in response to a search query. The tags can be determined based on the contents of the content item (e.g., recognized words, recognized objects in an image, characteristics of a video frame or audio stream, etc.).

In some implementations, the snippet packet generation occurs after the selection of a snippet packet generation interface element, which can open a snippet packet generation interface. Alternatively and/or additionally, a user can select a content item and one or more (e.g., two) pop-ups can be provided with various options for interacting with the content item, and one of the options can include snippet packet generation. Alternatively and/or additionally, search results associated with the content item may be provided.

In some implementations, a screenshot request can be received. The screenshot can be generated and uploaded to a new client, and a token can be generated. The token can be utilized to receive data associated with the screenshot. The token, the screenshot, and the screenshot details can be utilized to generate a snippet packet.

The systems and methods can be implemented to generate snippet packets based on other data sources outside of just web pages. For example, the systems and methods may be utilized to generate snippet packets based on content items in data files saved locally and/or saved on a server computing system. The generated snippet packet can include the content item (and/or a graphical card), address data, and location data. The address data can be descriptive of where the data file is saved (e.g., the name of the drive and the name of any folders (e.g., GAResearchPapers\Quantum\Spin)). The location data can be descriptive of where in the data file the content item is located. The location data can include start data and end data which can be utilized to find matching data in the data file, which can then be navigated to and highlighted. Alternatively and/or additionally, the location data can include one or more pointers.

The systems and methods can enable a user selection of a subset, excerpt, and/or part of an object (e.g., text, image, and/or video that may be part of a larger webpage). In some implementations, the systems and methods can segment a portion of text from a larger body of text, may segment a portion of an image, may isolate a frame in a video, and/or may segment a portion of an audio file.

In some implementations, the systems and methods can be utilized as an extension in a browser application and/or may be utilized as a feature that sits on the top of another application, such that the snippet packet generation can be utilized for content displayed in a variety of different application types. For example, the systems and methods can be built into an operating system of a computing device to allow for the snippet packet generation to occur for selections made in a variety of different applications (e.g., map applications, browser applications, social media applications, etc.).

Additionally and/or alternatively, the systems and methods can be utilized by a plurality of different computing devices of various types. For example, the systems and methods can be utilized by mobile computing devices, desktop computing devices, smart wearables (e.g., smart glasses), and/or other computing devices. The systems and methods may be utilized in virtual-reality interfaces and augmented-reality interfaces.

In some implementations, the snippet packet can include user context data descriptive of the context of the user when the snippet packet was generated. For example, the computing device can include a plurality of sensors that can collect data on the context of the user. In some implementations, physical location data of the user computing device can be obtained and stored in the snippet packet to provide further context to the snippet. The physical location data can be provided in the graphical card and/or may be provided as an optional dataset that can be viewed during snippet packet interaction.

The systems and methods can store the snippet packets locally on a user's device and/or may store the snippet packets on a server computing system. The local storage of the snippet packets can be utilized to ensure the snippet packet stays private to the user and can provide offline access. Additionally metadata related to the collection and generation of the snippet packet can be kept private and secure.

The systems and methods can be provided via a browser extension, via an overlay application, and/or via a built-in application feature. The systems and methods can be utilized on mobile devices, desktop devices, smart wearables, and/or other computing devices.

The snippet packet may include other metadata associated with the selected portion, the web page, and/or one or more contexts of the user (e.g., the application being used, a time of day, a geographic location of the user, and/or user profile data).

The systems and methods may be performed on a server computing system. Alternatively and/or additionally, the systems and methods can be performed locally on a user computing device. In some implementations, the user computing device can be communicatively connected via a network and may transmit data to perform cloud based computing. The snippet packets may be stored locally and/or may be stored on a server.

The systems and methods of the present disclosure provide a number of technical effects and benefits. As one example, the system and methods can generate and store snippet packets. In particular, the systems and methods disclosed herein can obtain input data, determine a content item (e.g., text, image, video, and/or audio) associated with the input data, generate a snippet packet, and store the snippet packet. The snippet packet can include a graphical representation of the content item that when selected can direct the user to a portion of a web page that the content item originates from. The snippet packet generation and saving can enable easy access to saved content while maintaining a link to more context on the content item.

Another technical benefit of the systems and methods of the present disclosure is the ability to leverage the snippet packet to share layered levels of information with relatively little transmission cost. For example, the systems and methods can generate a snippet packet. The snippet packet can be shared with a second user, who can initially view the content item. The second user can then select the content item to navigate to a web page and be routed to the particular portion of the web page the content item originates from, which can allow the second user to obtain more context on the content item. The providing of layered information can be completed with relatively low transmission cost as the content item, a web address, and text fragments may be transmitted. The second user can interact with the snippet packet, view the content item in isolation, can then select the snippet packet to use the web address in combination with the text fragments to navigate to a portion of the web page with the content item highlighted or otherwise indicated. Sending the whole web page file with highlighting may include much more upload and download during transmission.

Another example of technical effect and benefit relates to improved computational efficiency and improvements in the functioning of a computing system. For example, the systems and methods disclosed herein can leverage the snippet backet to mitigate the amount of data stored in order to save a content item and related web page context. In particular, the snippet packet may include a compressed version of the content item, a web address, and a text fragment in place of saving a compressed version of the full web page which may include a large quantity of content items and embedded data. Additionally, searching through a collection of snippet packets can be computationally less expensive than searching through a plurality of compressed web pages.

With reference now to the Figures, example embodiments of the present disclosure will be discussed in further detail.

Example Devices and Systems

FIG. 1A depicts a block diagram of an example computing system 100 that performs snippet packet generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more packet generation models 120. For example, the packet generation models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example packet generation models 120 are discussed with reference to FIGS. 2-4.

In some implementations, the one or more packet generation models 120 can be received from the server computing system 130 over network 180, stored in the user computing device memory 114, and then used or otherwise implemented by the one or more processors 112. In some implementations, the user computing device 102 can implement multiple parallel instances of a single packet generation model 120 (e.g., to perform parallel snippet packet generation across multiple instances of snippet selections).

More particularly, the packet generation model can receive input data, determine one or more selected content items, generate a snippet packet, and/or determine one or more tags. In some implementations, the packet generation model can process a selected content item and generate a summarization to be added to the snippet packet.

Additionally or alternatively, one or more packet generation models 140 can be included in or otherwise stored and implemented by the server computing system 130 that communicates with the user computing device 102 according to a client-server relationship. For example, the packet generation models 140 can be implemented by the server computing system 140 as a portion of a web service (e.g., a snippet packet generation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned packet generation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the packet generation models 120 and/or 140 based on a set of training data 162. The training data 162 can include, for example, training inputs (e.g., training gestures), training web pages, training, text data, training image data, ground truth graphical cards, ground truth snippet packets (e.g., ground truth snippet, ground truth address data, and/or ground truth location data), and/or ground truth entity labels.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
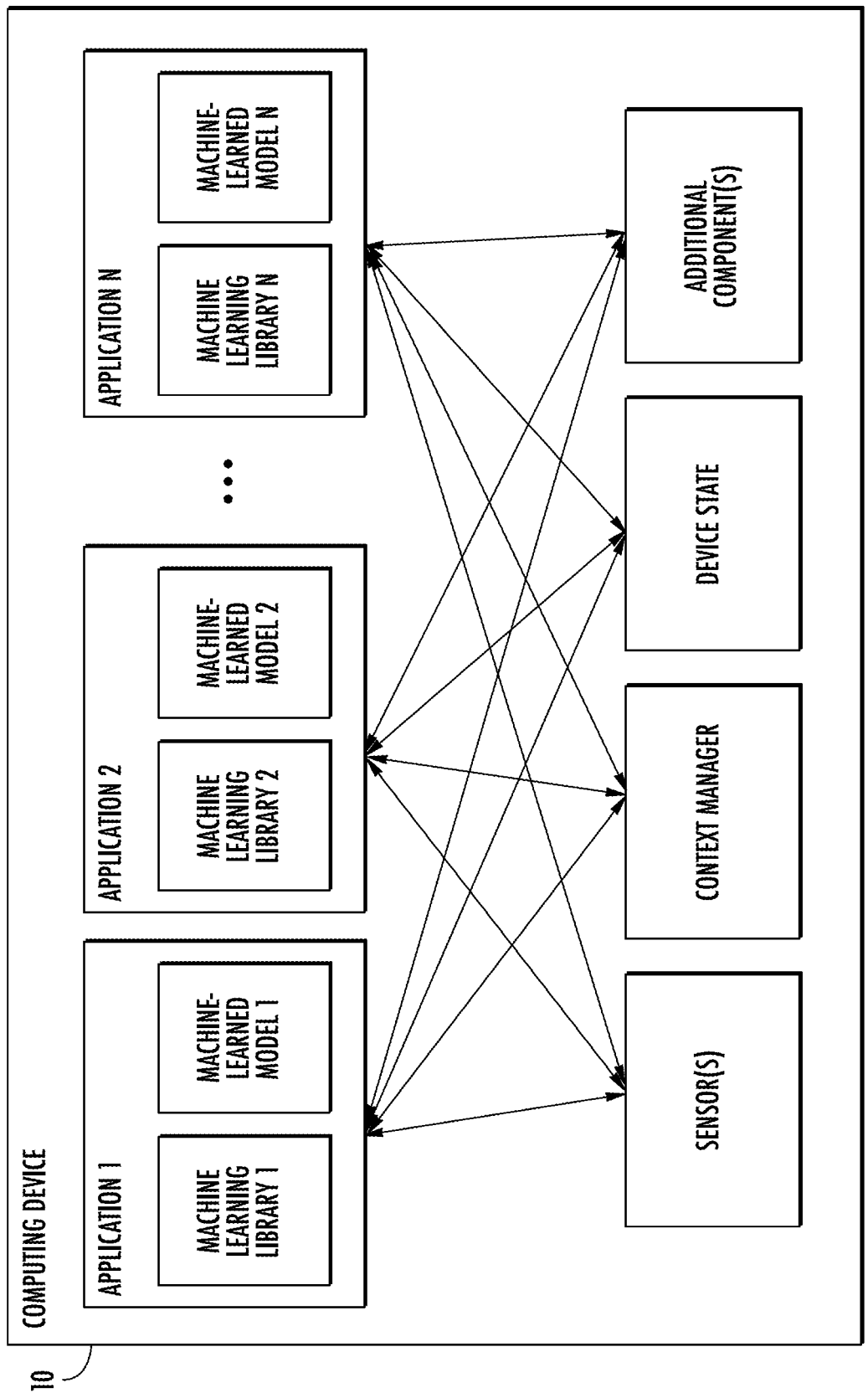
FIG. 1B depicts a block diagram of an example computing device that performs snippet packet generation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
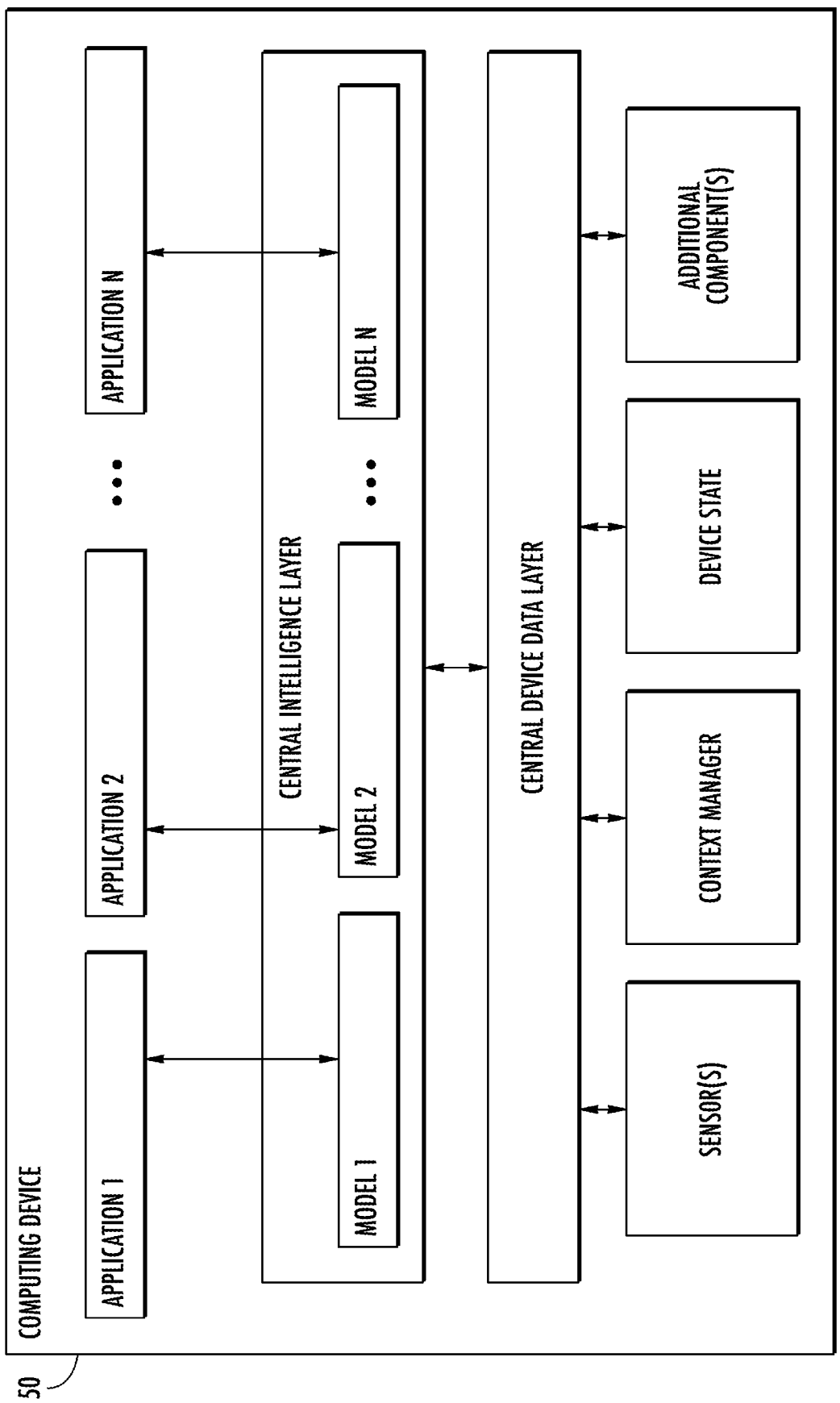
FIG. 1C depicts a block diagram of an example computing device that performs snippet packet generation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
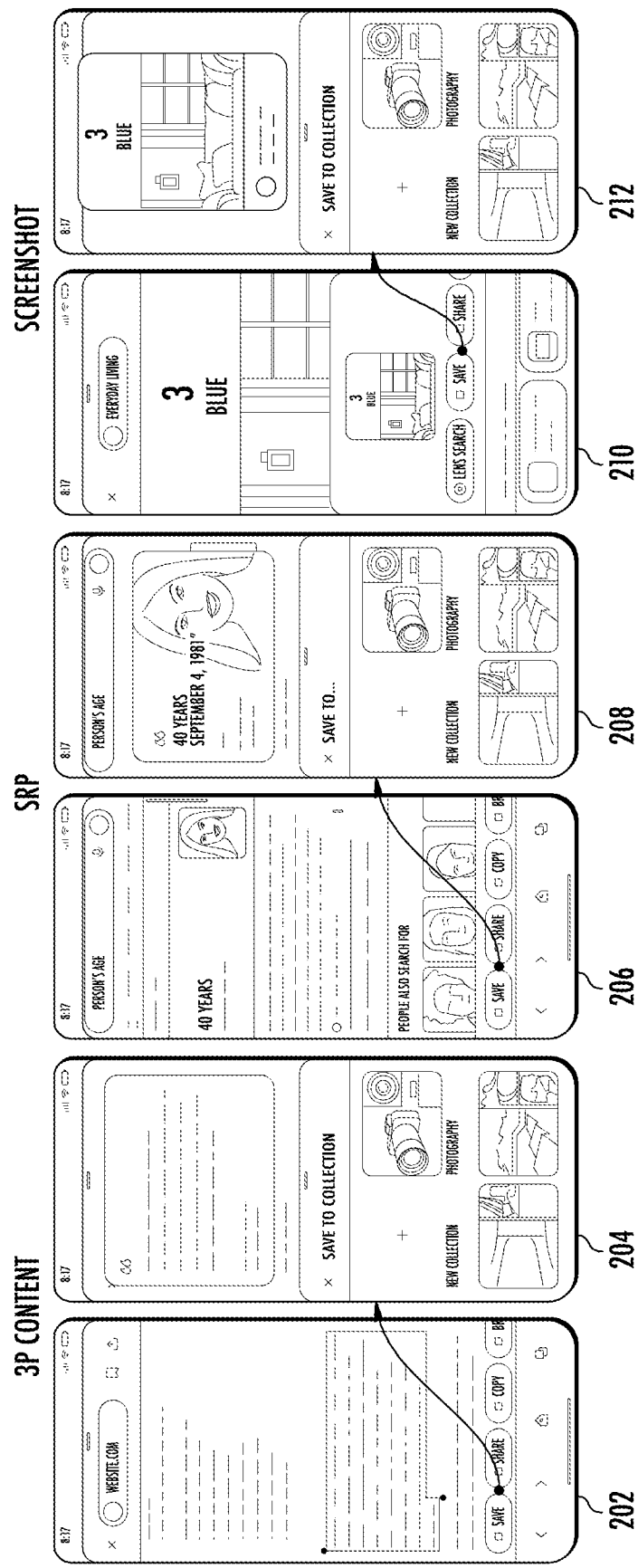
FIG. 2 depicts an illustration of an example snippet packet generation interface according to example embodiments of the present disclosure.

FIG. 2 depicts an illustration of an example snippet packet generation interface 200 according to example embodiments of the present disclosure. The snippet packet generation interface can be configured to receive a text selection, an image selection, a screenshot, a video selection, and/or an audio selection. An options menu can then pop-up with a plurality of options including a save option. The save option can be selected, which can prompt a graphical card to be generated and provided for display. The snippet packet can be generated. The user can then select which collection to save the snippet packet in.

For example, at 202, web page display window is provided for display, a portion of the web page including a text content item is selected, and a save user interface element is selected. At 204, a snippet packet was generated, and a generated graphical representation (e.g., a graphical card with a portion of the text with a title and a location indicated) is provided for display. Additionally, at 204, the user interface includes a pop-up window for providing an add to a collection option, which can include adding to a pre-existing collection and/or generating a new collection. The collections may be automatically generated and/or manually generated.

At 206, a portion of a search results web page is selected (e.g., a portion of a knowledge graph may be selected), and a save option may be selected. At 208, a graphical card is provided for display in which the graphical card was generated based on the selected portion of the search results page. For example, the graphical card can include a picture associated with the selected portion as the background with the selected text displayed in the foreground. Additionally and/or alternatively, the graphical card can include the search query and the associated search engine. The collection addition option can be provided.

At 210, a screenshot input was received, and a save option is provided for display. At 212, a save input was received, and a generated graphical representation and an add to collections option is provided for display. The graphical representation can include at least a portion of the screenshot and a banner that includes source information (e.g., a title for the web page, an entity associated with the screenshot information, and/or a source of the screenshot information).

The generated snippet packet can be stored with the generated graphical representation. A user may then select the snippet packet to view an enlarged graphical representation, to view the saved content item(s), and/or to navigate to the particular point in the web page where the content item(s) are from in the resource.

Figure 3:
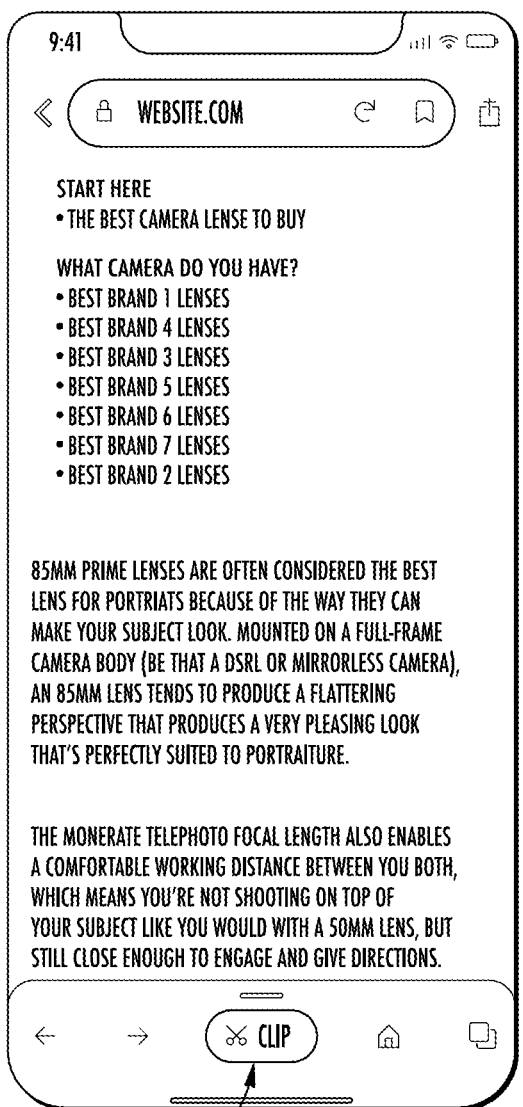
FIG. 3 depicts an illustration of an example gesture interaction according to example embodiments of the present disclosure.
Figure 3:

FIG. 3 depicts an illustration of an example gesture interaction 300 according to example embodiments of the present disclosure. For example, a user input requesting a clipping interface can be received (e.g., a selection of a "clip" user interface element 302). A snippet packet generation interface can be provided, and a graphical animation 304 can be provided to demonstrate how to select content items. The graphical animation can demonstrate that a swipe gesture in a circular motion can be utilized to select content items. An instructions user interface element 306 may be provided as a pop-up to provide instructions on how to clip and save.

Figure 4:
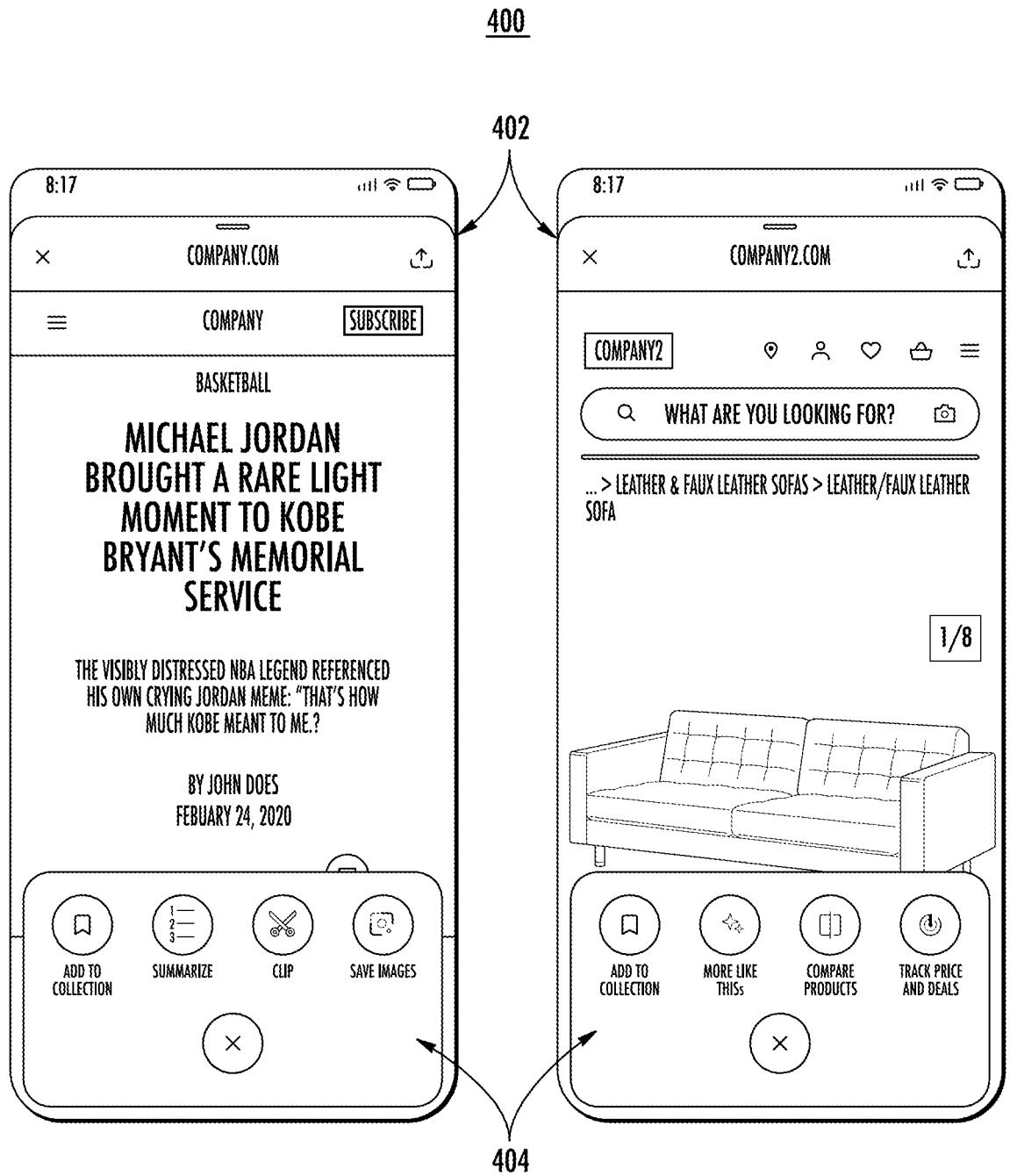
FIG. 4 depicts an illustration of an example snippet packet generation interface according to example embodiments of the present disclosure.

FIG. 4 depicts an illustration of an example snippet packet generation interface 400 according to example embodiments of the present disclosure. In some implementations, the snippet packet generation interface can be requested based on a received user input, and the snippet packet generation interface can be provided. The snippet packet generation interface can include clipping options or summarization options that can allow for a snippet packet to be generated based on selected content items. The snippet packet generation interface 400 can include a web page display window 402 and an interactions pane 404, which can be provided in response to a web page interaction and can provide a plurality of web page interaction options for display. The interaction options can be predetermined and uniform across web pages. Alternatively and/or additionally, the interaction options can vary based on the contents of the web page, based on the selected content items, and/or based on an entity associated with the web page. The interaction options can include adding to a collection, summarizing the selected portion and/or the entire web page, clipping a portion of the web page, save an image, find more web pages like the current web page, compare a product in the web page to other similar products, and/or a track price option.

Figure 5:
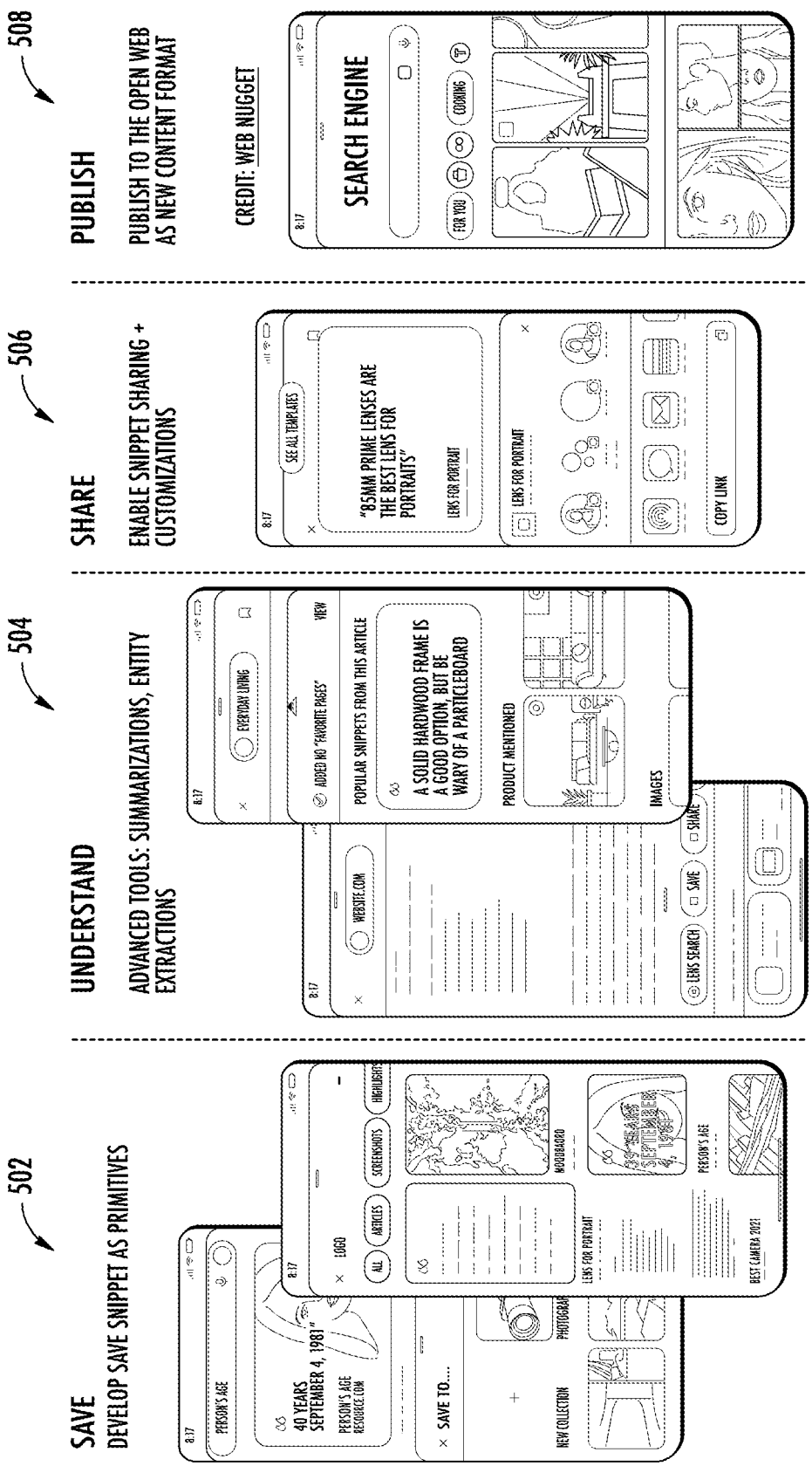
FIG. 5 depicts an illustration of an example snippet packet generation and collection addition interface according to example embodiments of the present disclosure.

FIG. 5 depicts an illustration of an example snippet packet generation and collection addition interface 500 according to example embodiments of the present disclosure. The systems and methods disclosed herein can be utilized to generate and save snippet packets. The snippet packets can be added to collections and may be searchable for later use. The snippet packets can include generated graphical cards. In some implementations, the selected content item can be processed by one or more machine-learned models to generate a summarization of the content item, which can be utilized to generate the graphical card. The graphical card can be customizable. The graphical card may include a background color and/or a background image determined based on the source web page. Alternatively and/or additionally, the background color and/or the background image may be user selected. Similarly, the font may be automatically determined, predetermined, and/or user selected.

At 502, a snippet packet (including a graphical representation) is generated based on a selected portion of the web page. The generated snippet packet is then added to an "Inspo" collection of media content items and snippet packets.

At 504, a summary is generated for a portion of a web page and a graphical card is generated based on the semantic understanding and/or a determined entity. The generated graphical card can be saved as part of a generated snippet packet and can be added to a collection. The collection may be associated with a particular entity and/or a particular type of entity.

At 506, different options for sharing and/or customizing a generated snippet packet is provided for display. For example, the template, the text, and/or the background of the graphical representation can be customized. The sharing options can include adding to a collection, adding to notes, sending via text message, sending via email, copying, and/or air dropping.

At 508, the snippet packets can be published to social media and/or may be published to a localized search interface. For example, a user may utilize a search application, which can surface a plurality of web search results responsive to the query and/or may surface one or more generated snippet packets responsive to the query (e.g., generated snippet packets of the particular user and/or generated snippet packets of associated users (e.g., friends or users proximate to the particular user)).

The generated snippet packets can then be shared via messaging applications, social media applications, and/or a variety of other methods. In some implementations, the snippet packet can be published to the web and may be utilized as a new format of web search results.

Figure 9:
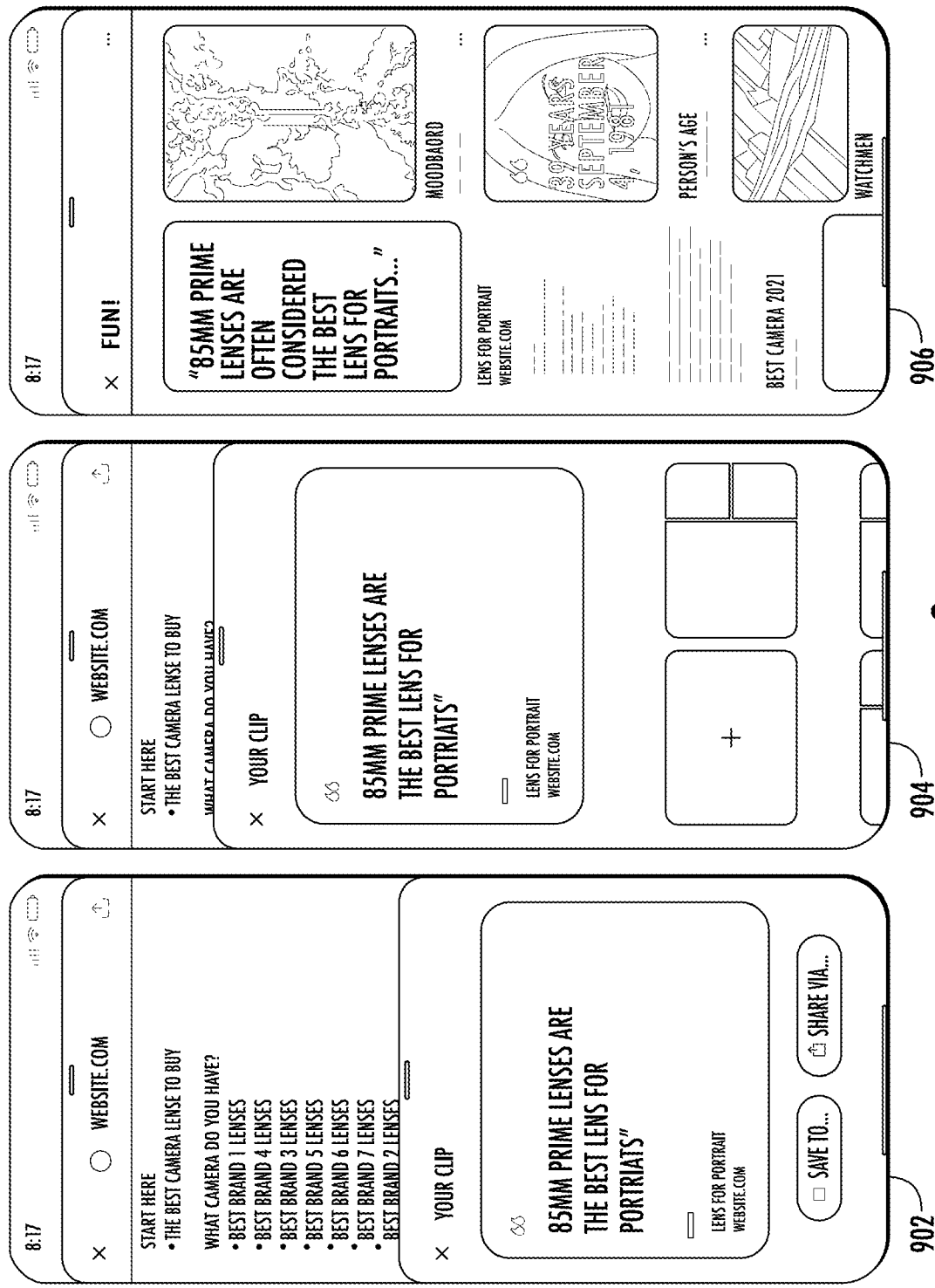
FIG. 9 depicts an illustration of an example collection addition interface according to example embodiments of the present disclosure.

FIG. 9 depicts an illustration of an example collection addition interface 900 according to example embodiments of the present disclosure. The collection addition interface can provide the content item and/or a graphical representation of the snippet packet (e.g., a graphical card) for display. In response to a save element being selected, a plurality of collections can be provided for display. A user can then add the snippet packet to a particular collection. The snippet packet can then be stored in the particular collection.

The particular collection can then be opened, and a graphical representation of the generated snippet packet can be provided for display alongside other graphical representations associated with other snippet packets. The collection addition interface 900 may include displaying the graphical card (at a first size) for display upon snippet packet generation 902. The pop-up window 904 for collection addition can then be provided for display upon selection of a user interface element. When the snippet packet is added to a particular collection, the collection 906 may then be provided for display with a plurality of thumbnails descriptive of the different snippet packets in the collection including a thumbnail descriptive of the generated graphical card (at a second size).

Figure 10A:
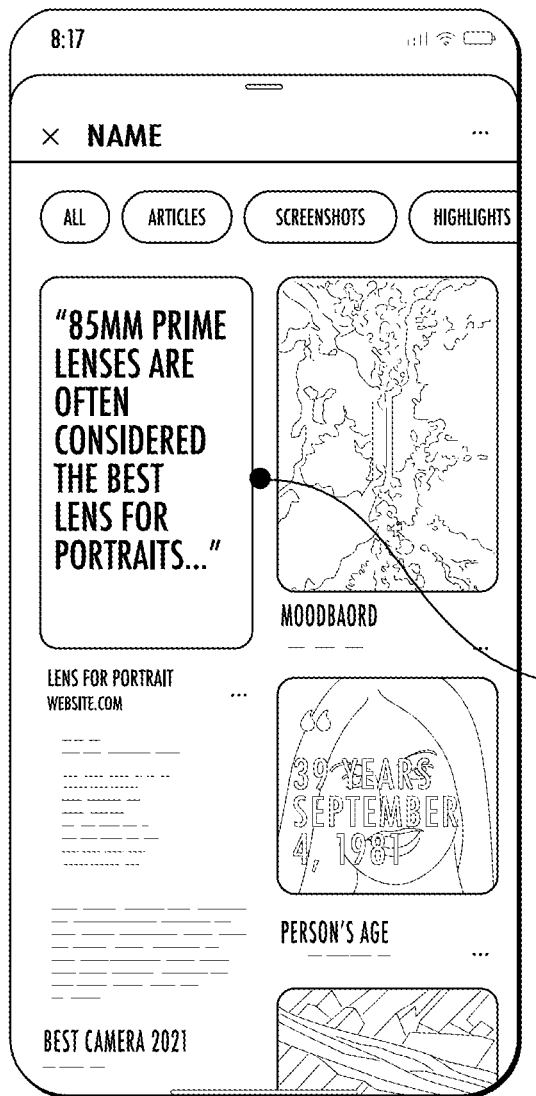
FIG. 10A depicts an illustration of an example snippet packet interaction according to example embodiments of the present disclosure.
Figure 10A:
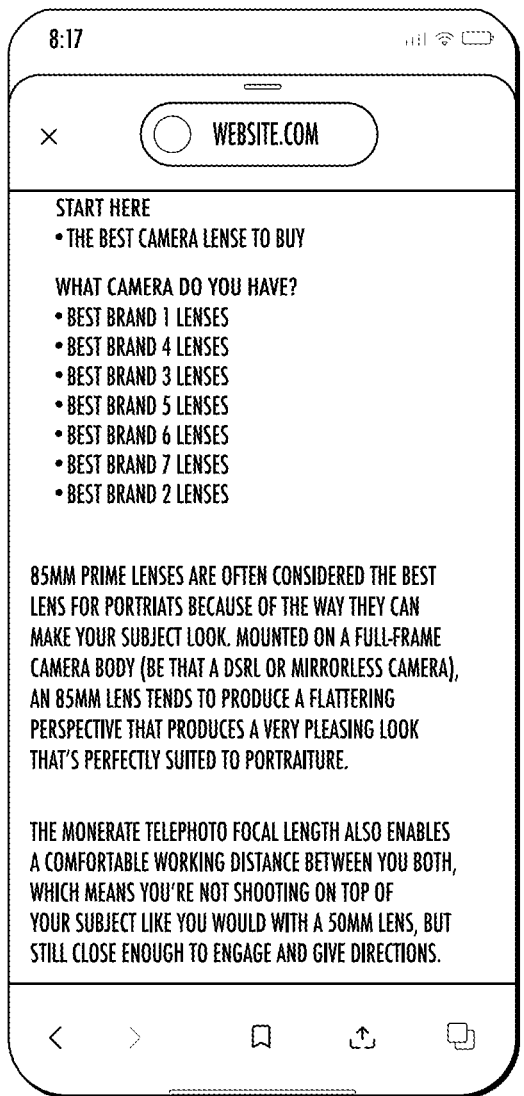

FIG. 10A depicts an illustration of an example snippet packet interaction 1020 according to example embodiments of the present disclosure. Once a snippet packet is generated, the snippet packet can be interacted with to navigate to the web page associated with the content item. The location data of the snippet packet can be utilized to navigate to the particular portion of the web page that contains the source of the content item. The content item can be highlighted when displayed. For example, a graphical card of 1022 can be selected. The address data and location data of the snippet packet associated with the graphical card can then be obtained. The address data and the location data can then be utilized to open the web page of 1024 to the exact location of the one or more content items of the selected snippet packet with the one or more content items highlighted.

Figure 10B:
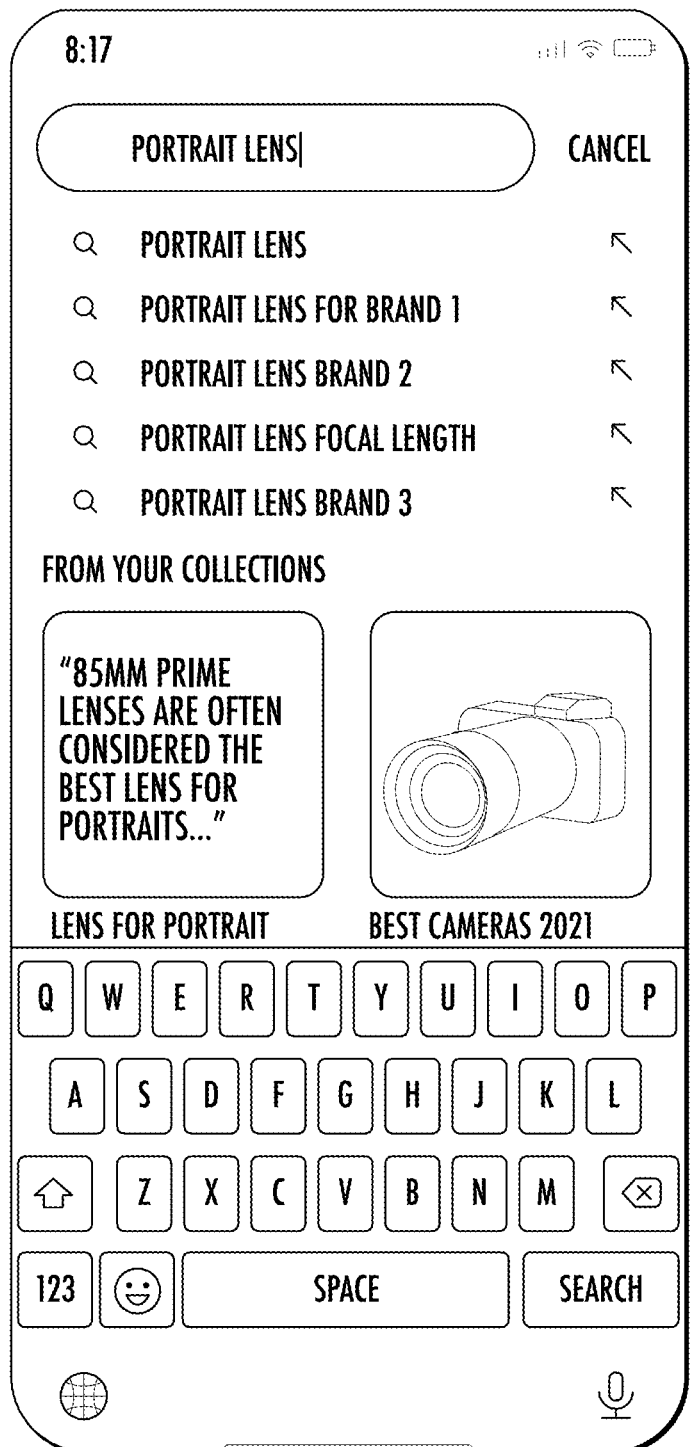
FIG. 10B depicts an illustration of an example snippet packet search according to example embodiments of the present disclosure.

FIG. 10B depicts an illustration of an example snippet packet search 1040 according to example embodiments of the present disclosure. The generated snippet packet can be provided as a search result when searching locally and/or when searching the web. For example, a user can input a search query, which can be processed to determine a plurality of suggested queries and a plurality of suggested snippet packets, which can be provided for display (e.g., as shown in 1042) as further inputs may be received.

Figure 10C:
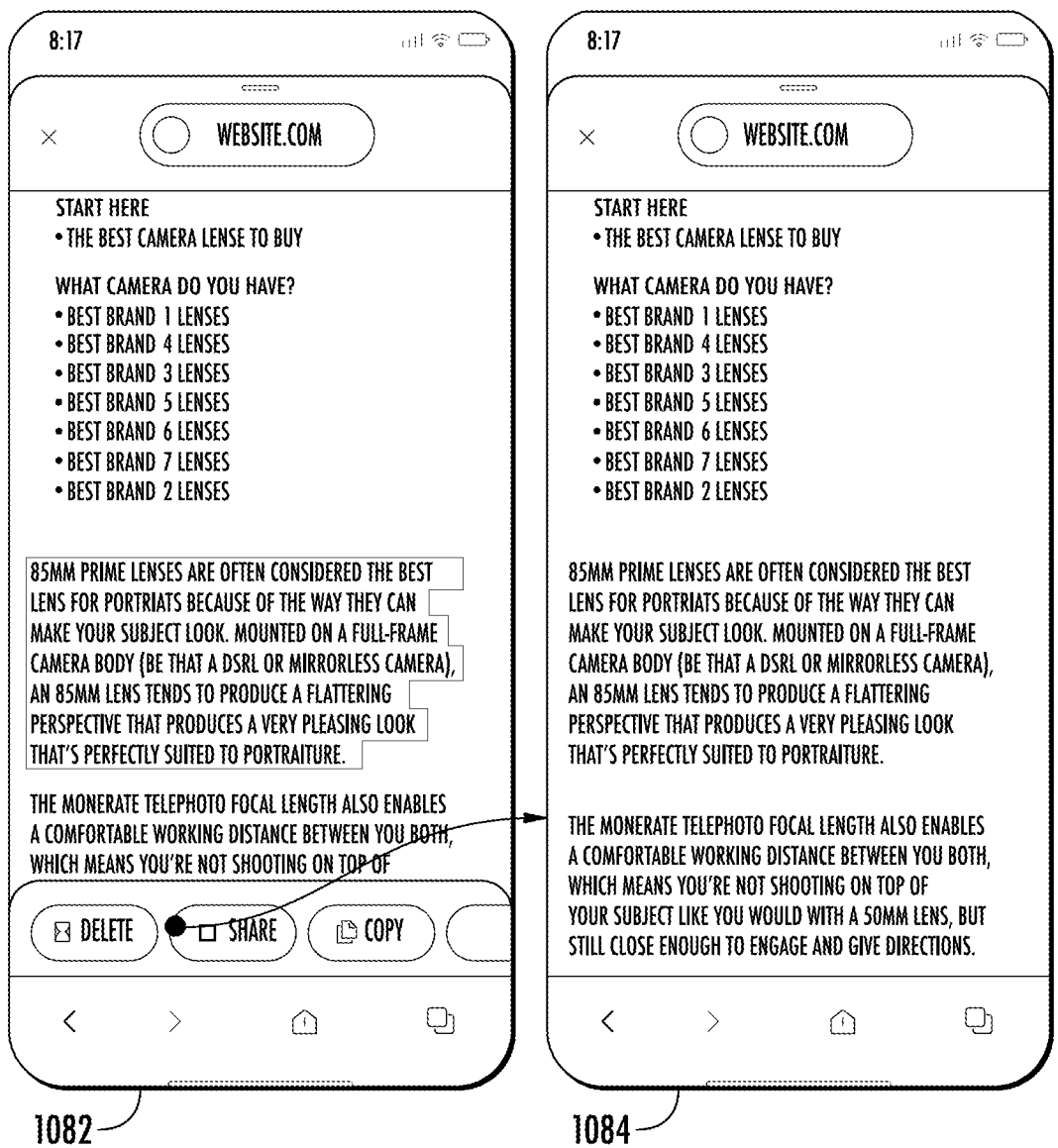
FIG. 10C depicts an illustration of an example highlight interface according to example embodiments of the present disclosure.

FIG. 10C depicts an illustration of an example highlight interface 1080 according to example embodiments of the present disclosure. In some implementations, the highlighting (e.g., as shown in 1082) can be removed (e.g., as shown in 1084) in response to receiving a user input requesting the removal of the highlighting.

Figure 11:
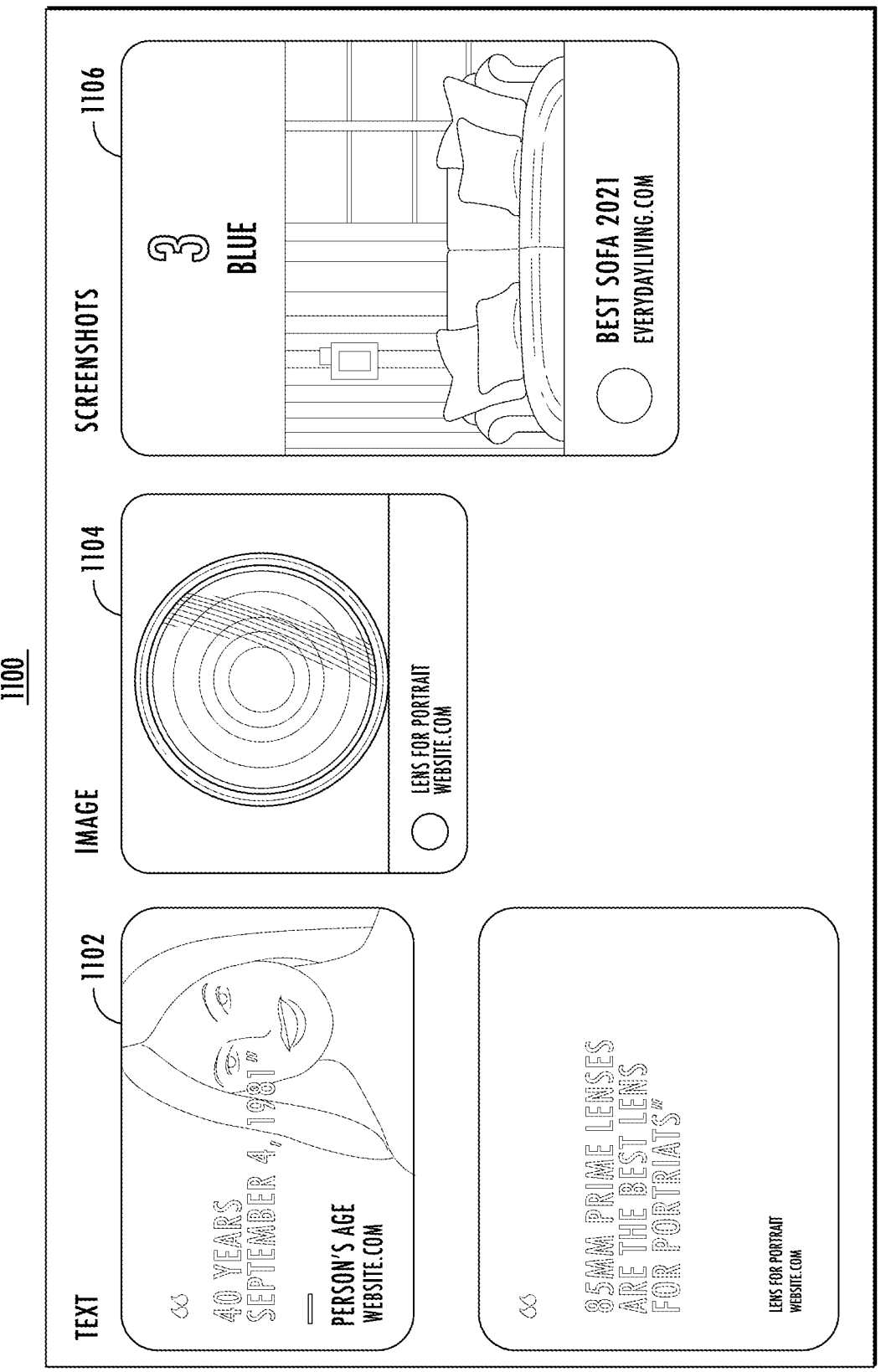
FIG. 11 depicts an illustration of example graphical cards according to example embodiments of the present disclosure.

FIG. 11 depicts an illustration of example graphical cards 1100 according to example embodiments of the present disclosure. The graphical cards can be automatically generated and/or may be generated based on one or more user inputs. The graphical cards can include a portion allocated for the content item and/or a portion allocated for attribution to the source of the content item. The graphical card can include text, image(s), video(s), and/or audio. The graphical card can vary based on the content item selected. The text can be selected text and/or can be a summarization of data obtained from the web page. In some implementations, the background and/or the image can be automatically selected/generated and/or may be user selected. In particular, FIG. 11 depicts two formats of text-based graphical cards 1102 with resource attribution and an associated title/search query; an image-based graphical card 1104 with the image, an entity thumbnail, a title or caption, and resource attribution; and a screenshot-based graphical card 1106 that includes the screenshot, an entity logo, a title of the respective article, and resource attribution.

Figure 12:
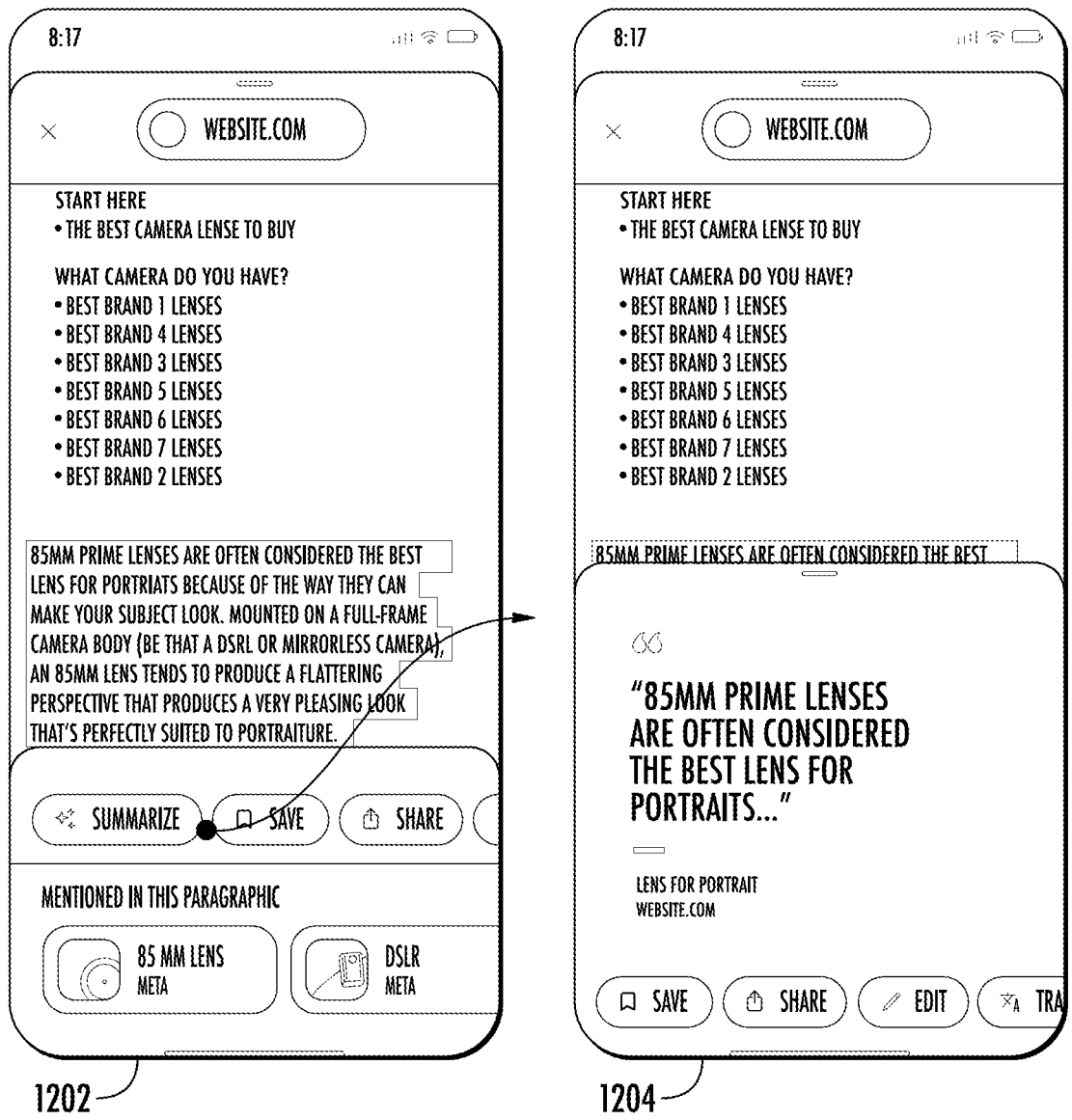
FIG. 12 depicts an illustration of an example summary snippet packet generation interface according to example embodiments of the present disclosure.

FIG. 12 depicts an illustration of an example summary snippet packet generation interface 1200 according to example embodiments of the present disclosure. Snippet packet generation can include generating a graphical card. The graphical card can include text descriptive of a summarization of selected data in the web page. The summarization can be generated by processing the selected data with a machine-learned model. For example, at 1202, a portion of a web page is selected. A user can select the summarize user interface element to process the selected portion to generate a summary. The summary can include language from the passage and/or may include differing language that summarizes the passage in simple terms or more user-specific terms. At 1204, the summarized text is utilized to generate a graphical card to be stored with the generated snippet packet that includes information associated with the web page and the particular location of the selected portion within the web page.

Figure 13:
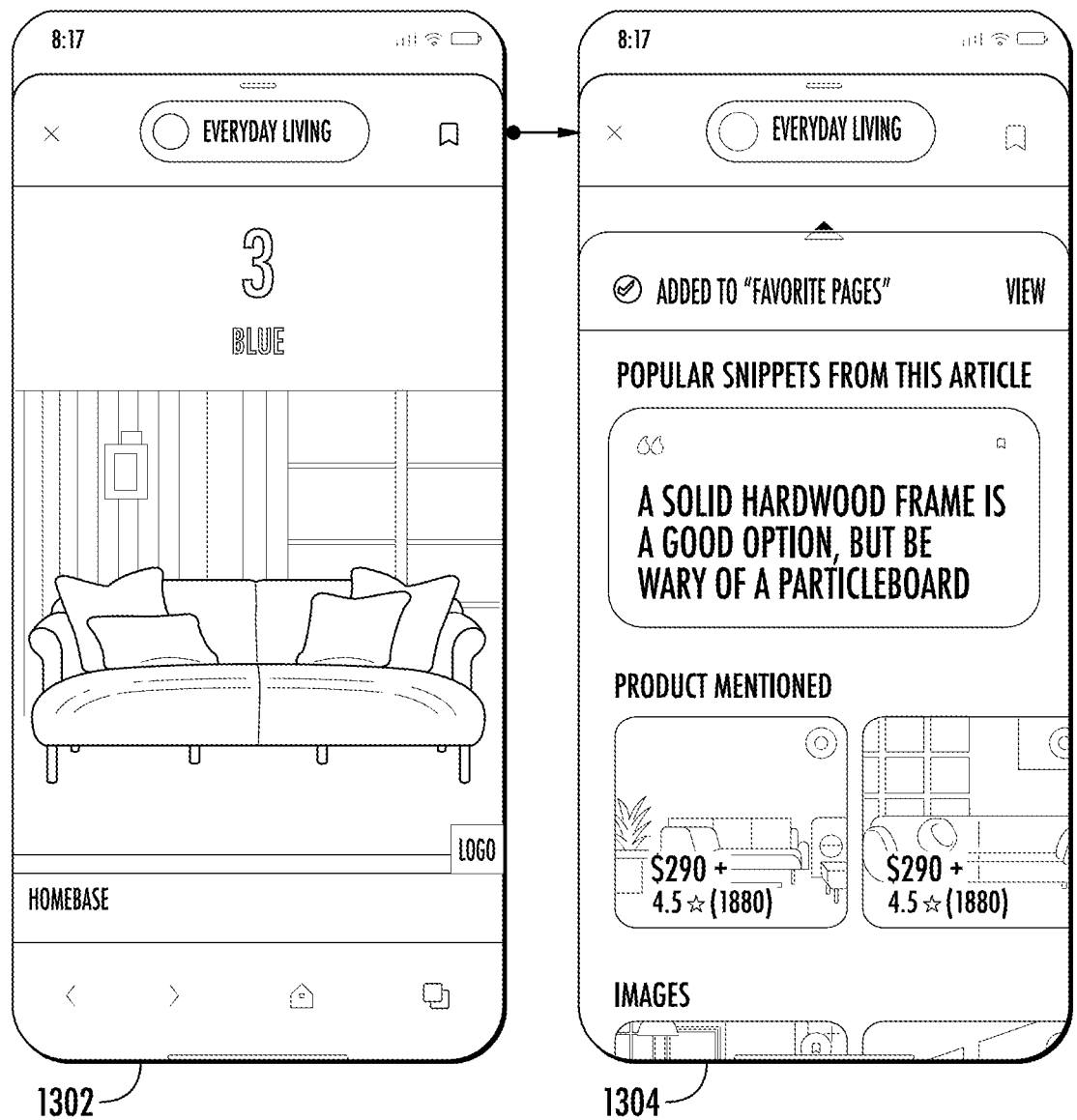
FIG. 13 depicts an illustration of an example snippet packet suggestion interface according to example embodiments of the present disclosure.

FIG. 13 depicts an illustration of an example snippet packet suggestion interface 1300 according to example embodiments of the present disclosure. In some implementations, the snippet packet suggestion interface can include providing suggested graphical cards associated with suggested snippet packets (e.g., as shown in 1304, which may be displayed in response to the selection of a bookmark option as shown in 1302). The suggested snippet packets can be based on past user interactions by the specific user and/or based on past interactions by other users (e.g., popular snippets). The suggested snippet packet can be selected and stored locally by the user computing system.

Figure 14:
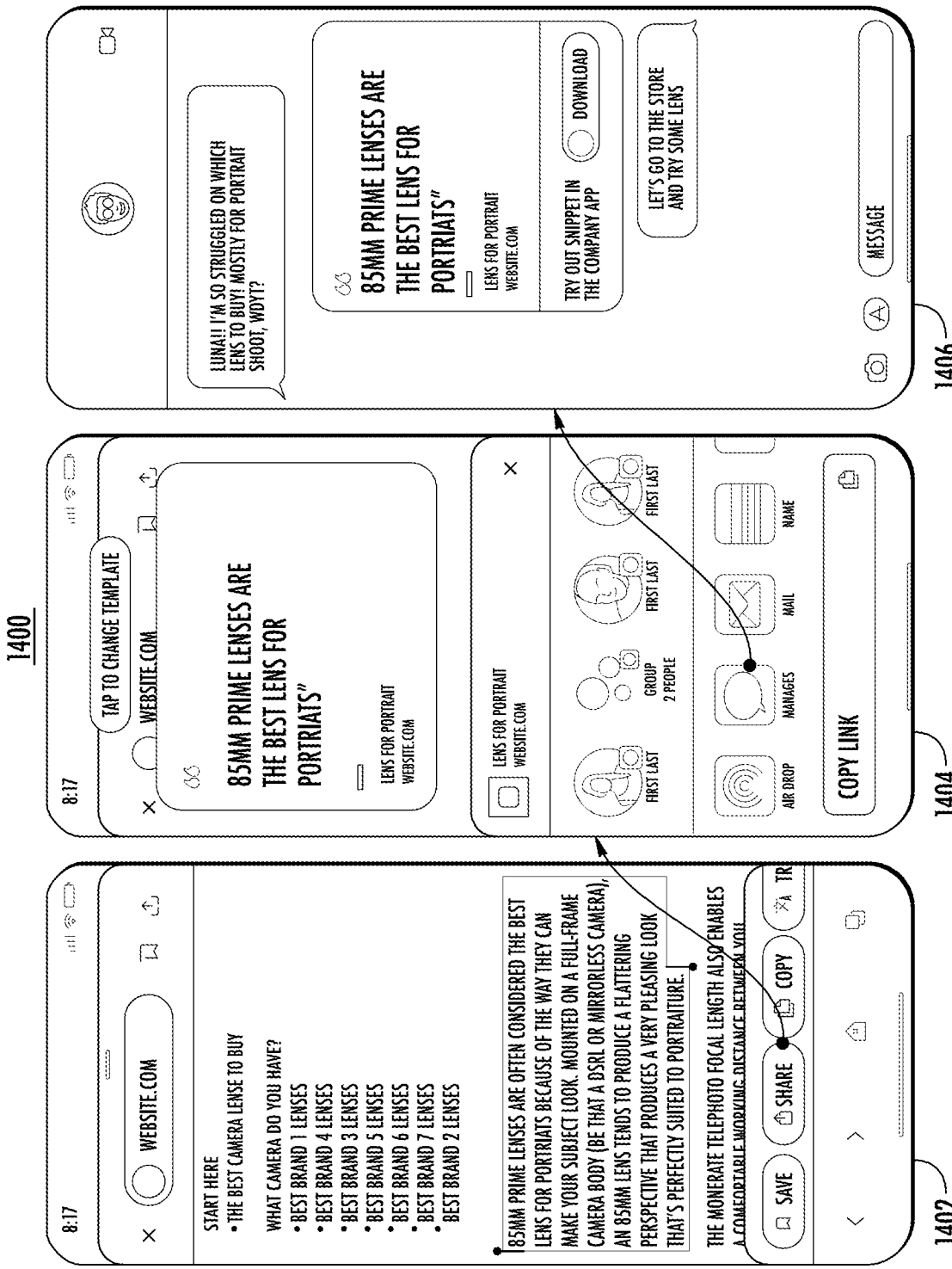
FIG. 14 depicts an illustration of an example snippet packet generation and sharing interaction according to example embodiments of the present disclosure.

FIG. 14 depicts an illustration of an example snippet packet generation and sharing interaction 1400 according to example embodiments of the present disclosure. The snippet packet can be generated in response to a user selection of a content item (e.g., the selection in 1402). The generated snippet packet can then be shared (e.g., shared via a text message option of a share interface 1404 that provides a plurality of sharing options). The snippet packet can be shared via a messaging application, a social media application, and/or may be inserted into another data file (e.g., a note, a text document, and/or a slide deck). The shared snippet packet may be sent with the graphical card and a download option for local saving (e.g., as shown in 1406). Alternatively and/or additionally, the graphical card may be selectable to navigate to the one or more content items of the snippet packet in the native web page.

Figure 15:
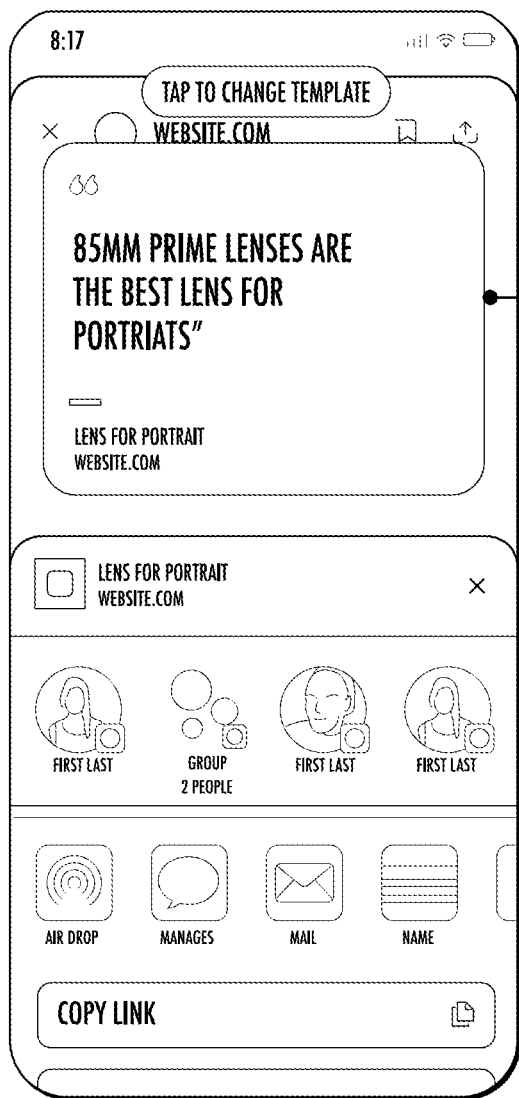
FIG. 15 depicts an illustration of an example graphical card customization interface according to example embodiments of the present disclosure.
Figure 15:
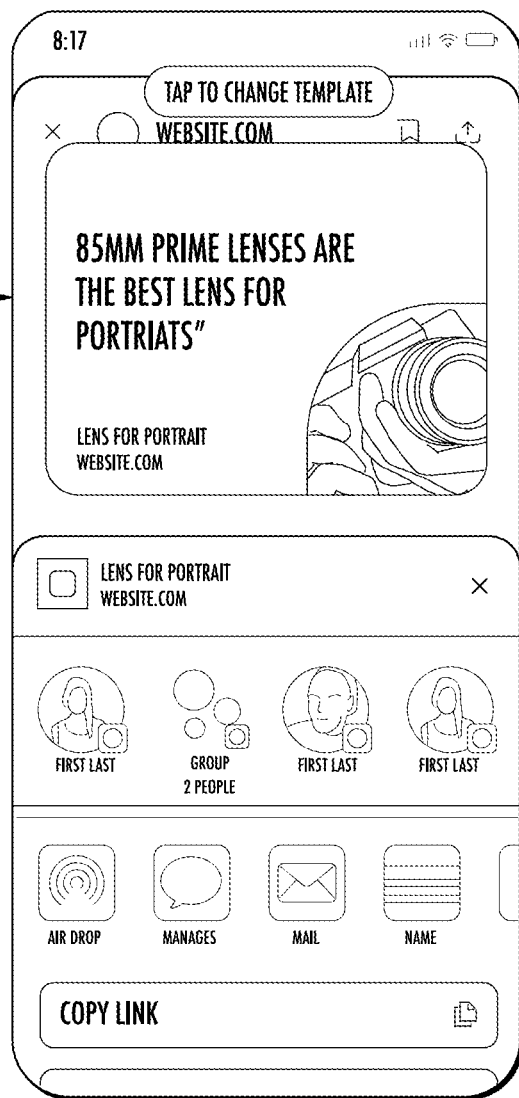

FIG. 15 depicts an illustration of an example graphical card customization interface 1500 according to example embodiments of the present disclosure. The graphical card customization interface can involve a plurality of templates that can be selected to customize the graphical card. The templates can include different images, different colors, different fonts, and/or different layouts. For example, an initial graphical card 1502 may include the text in a first font, the text in a first size, and a first background. A change template request can be received, and an augmented graphical card 1504 can be generated with different text font, different text size, and/or a different background.

Figure 16:
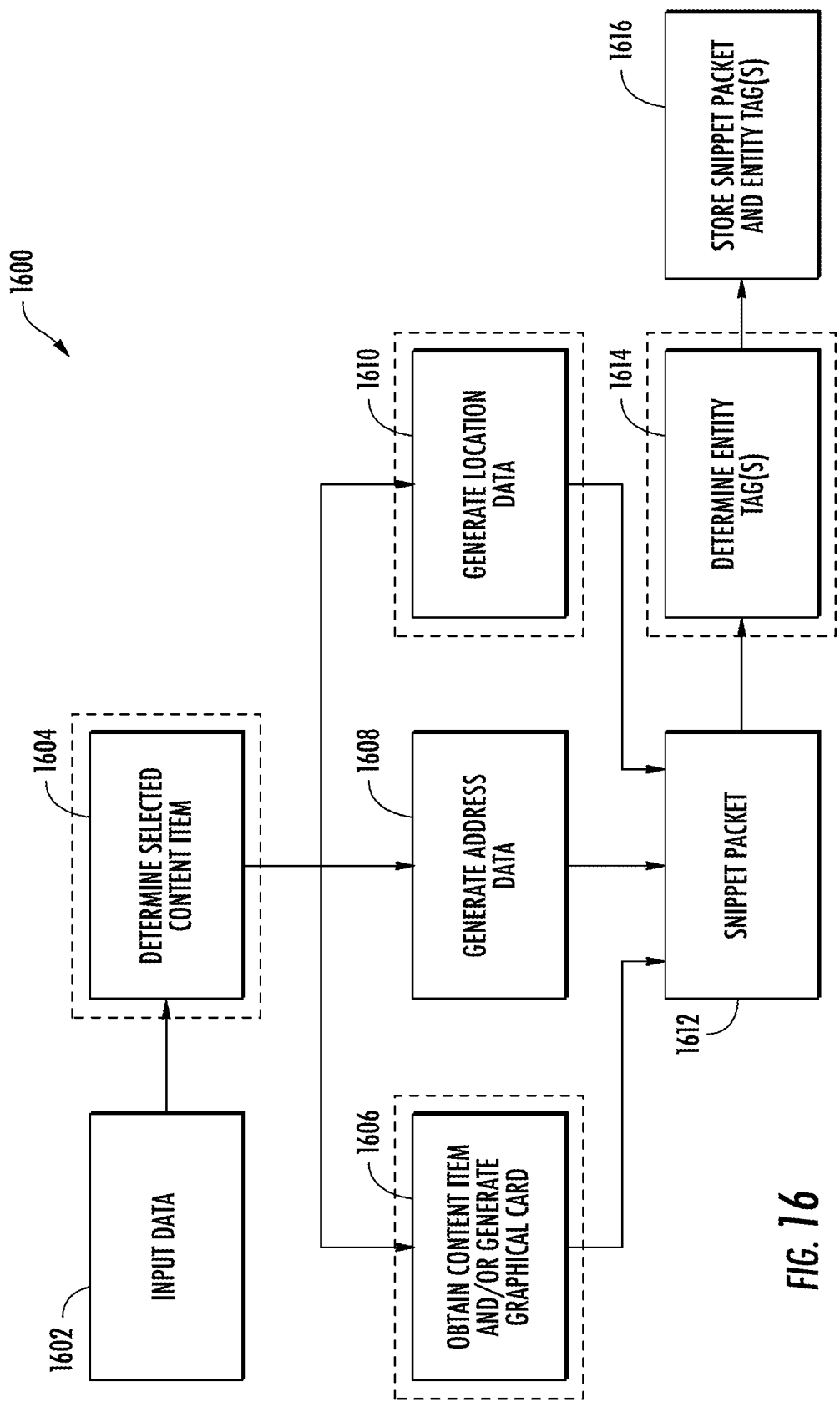
FIG. 16 depicts a block diagram of an example snippet packet generation system according to example embodiments of the present disclosure.

FIG. 16 depicts a block diagram of an example snippet packet generation system 1600 according to example embodiments of the present disclosure. The snippet packet generation system 1600 can include obtaining input data 1602 (e.g., input data descriptive of a selection of one or more content items). The input data 1602 can be processed to determine a selected content item 1604. Based on the determined selection, the content item can be obtained, and a graphical card 1606 can be generated. Address data 1608 can be generated and/or obtained. The address data 1608 can include uniform resource locator data. Location data 1610 can be generated and/or obtained. The location data 1610 can include text fragment data that can include a scroll position, a start of the content item, and an end of a content item that can be utilized to find and highlight the content item within the source page. The graphical card 1606, the content item, the address data 1608, and the location data 1610 can be utilized to generate the snippet packet 1612. The snippet packet 1612 can be processed to determine one or more entity tags 1614 for the snippet packet 1612 based on the content item and/or based on the source of the content item. The entity tag 1614 can include relationship data that links the snippet packet 1612 with other snippet packets associated with the same entity. The snippet packet 1612 with the entity tag(s) 1614 can then be stored 1616 (e.g., locally and/or on a server computing system).

One or more of the determinations and/or one or more of the generations can be performed based at least in part on one or more machine-learned models. For example, determining the selected content item 1604, obtaining the content item and/or generating a graphical card 1606, generating location data 1610, and/or determining entity tags 1614 can be performed by one or more machine-learned models.

Example Methods

Figure 6:
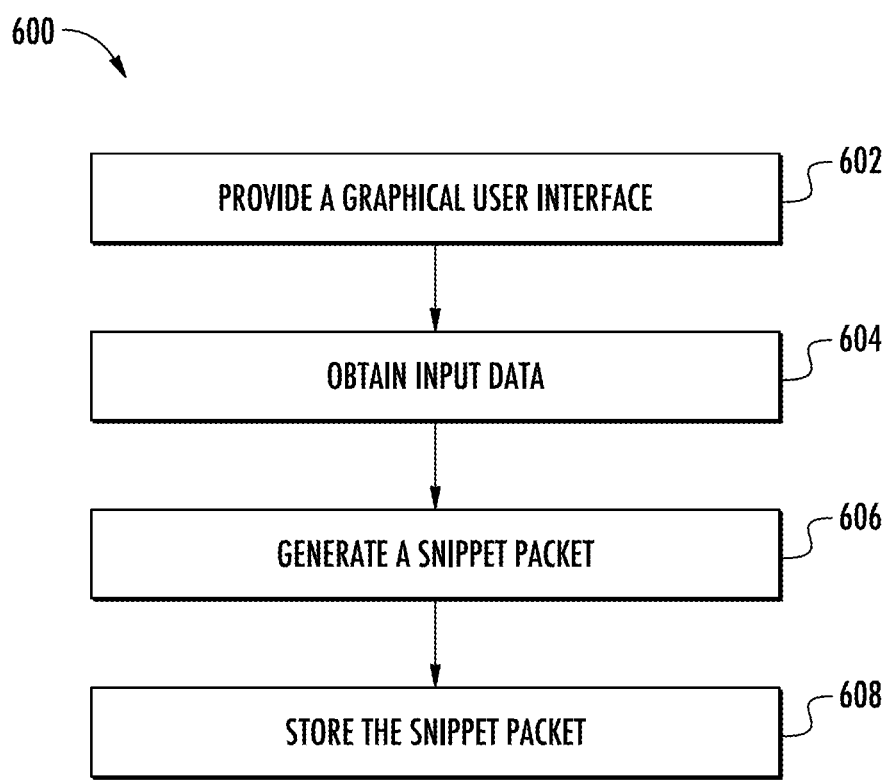
FIG. 6 depicts a flow chart diagram of an example method to perform snippet packet generation according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can provide data descriptive of a graphical user interface. The graphical user interface can include a graphical window for displaying a web page. In some implementations, the web page can include a plurality of content items.

At 604, the computing system can obtain input data. The input data can include a request to save one or more content items of the plurality of content items. In some implementations, the one or more content items can include at least one of an image, a video, a graphical depiction of a product, or audio.

At 606, the computing system can generate a snippet packet. The snippet packet can be generated based on the input data. The snippet packet can include the one or more content items, address data, and location data.

The one or more content items can include text data (e.g., text data descriptive of a word, a sentence, a quote, and/or a paragraph), image data (e.g., an image of an object (e.g., a product)), video data (e.g., a video and/or one or more frames of a video), audio data (e.g., waveform data), and/or latent encoding data. The one or more content items can include multimodal data.

In some implementations, generating the snippet packet can include obtaining the one or more content items and generating a graphical card. The graphical card can be descriptive of the one or more content items. The graphical card can include text data overlaid over a color and/or an image. The color may be determined based on a predominant color of the web page. In some implementations, the color may be predetermined and/or may be determined based on surrounding content items. The image may be an image determined based on a determined topic of the content item. Alternatively and/or additionally, the image may be an image proximate to the content item. In some implementations, the graphical card can include a font determined based on a font used in the web page. The graphical card can include a background, text descriptive of the content item (e.g., the content item and/or a summarization of the content item), and/or text and/or a logo descriptive of the source and/or a determined entity. In some implementations, the text size for the text in the graphical card can be based on the amount of text in the content item.

The address data can be descriptive of a web address for the web page. The address data can include a uniform resource identifier and/or a uniform resource locator.

The location data can be descriptive of a location of the one or more content items within the web page. In some implementations, the location data can include at least one of a scroll position, a start node, or an end node. The scroll position can be descriptive of the location of the one or more content items in relation to other portions of the web page. In some implementations, the start node can be descriptive of where the one or more content items begin. The end node can be descriptive of where the one or more content items end. The location data can include a text fragment (Tomayac et al., "Scroll to Text Fragment," GITHUB, (May 20, 2022, 9:40 PM) https://github.com/WICG/scroll-to-text-fragment.) that can be utilized to indicate the location of the content item. In some implementations, the text fragment can include one or more text directives associated with the location. The text directive can include a string of code start data (e.g., the first text associated with the content item and/or the first pixels associated with the content item) and/or end data (e.g., the last text associated with the content item and/or the last pixels associated with the content item). The text directive can be utilized to search the web page for a set of data that matches the beginning and/or the end of the content item.

In some implementations, the computing system can include processing the one or more content items to determine an entity associated with the one or more content items. An entity tag can be generated based on the entity. The snippet packet can include the entity tag.

At 608, the computing system can store the snippet packet. The snippet packet can be associated with a particular user. The association with a particular user can include storing the snippet packet with metadata indicating the user and/or associating the snippet packet with a specific user profile. The particular user can be the user that provides the input data that is processed to determine a snippet packet generation request. The snippet packet may be stored in a user database. In some implementations, storing the snippet packet in the user database can include storing the snippet packet locally on a mobile computing device. Additionally and/or alternatively, the graphical card can be stored as a graphical representation of the snippet packet. The graphical card can be automatically generated and may be customizable by the user. The graphical card can begin with a template that can be customized based on other content in the web page, based on user input, and/or based on other context. In some implementations, the graphical card can include multimodal data. Alternatively and/or additionally, the snippet packet can be stored on a server computing system. In some implementations, if the content item references another content item, then the systems and methods can obtain the additional content item and save the additional content item in the snippet packet.

In some implementations, the systems and methods can include receiving a snippet request to provide a snippet interface. The snippet interface can include an interactive element associated with the snippet packet. The snippet interface can be provided for display. An interface selection can be received, and the interface selection can be descriptive of a selection selecting the interactive element. A portion of the web page can then be provided for display. In some implementations, the portion of the web page can include the location of the one or more content items within the web page.

In some implementations, the systems and methods can include receiving an insertion input. The insertion input can include a user input requesting the insertion of the content item into a different interface. The snippet packet can be provided to a third party server computing system.

Additionally and/or alternatively, the systems and methods can include adding the snippet packet to a collection. The snippet packet can be added to a collection based on received user input. Alternatively and/or additionally, the snippet packet can be added to a collection automatically based on a determined entity associated with the content item. In some implementations, the snippet packet can be added to a collection based on the source of the content item (e.g., the type of web page, a type of media provider, and/or based on the type of content item).

In some implementations, the snippet packet can be generated based on content items obtained from a source other than a web page (e.g., a mobile application, a large data file (e.g., a downloaded video or book), and/or another source of data).

Figure 7:
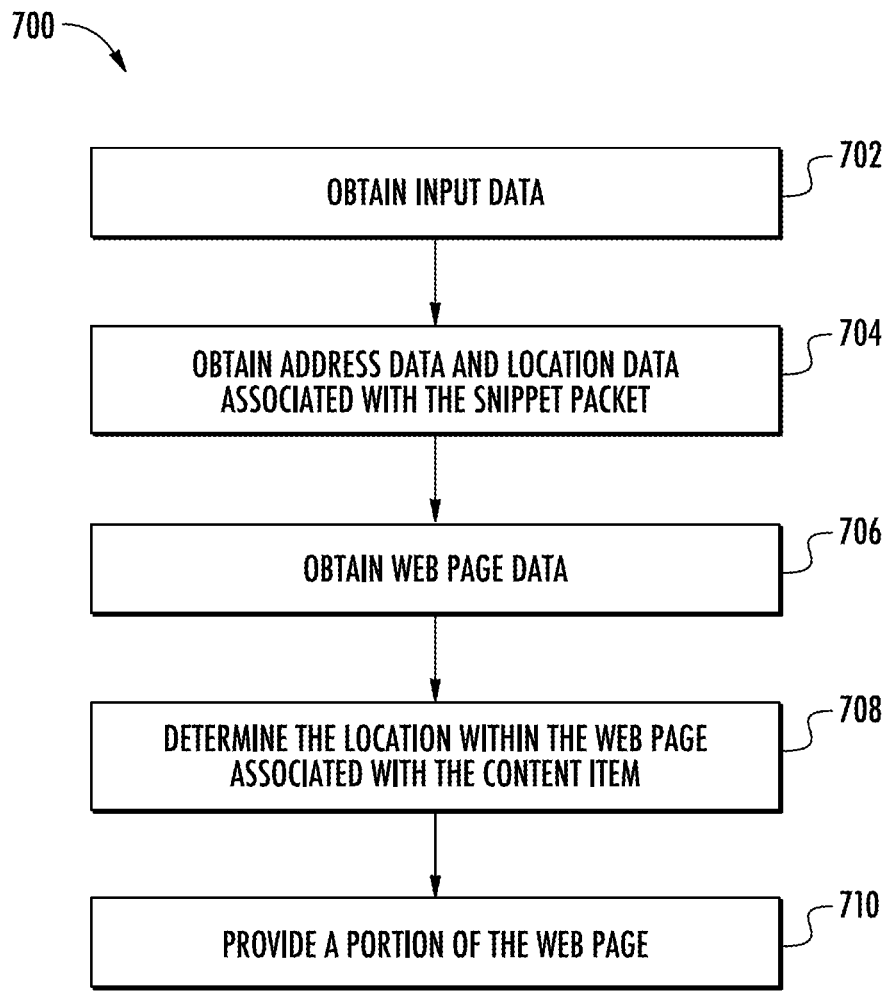
FIG. 7 depicts a flow chart diagram of an example method to perform snippet packet interaction according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain input data. In some implementations, the input data can be descriptive of a selection of a content item associated with a snippet packet. The snippet packet can be associated with a user account of a specific user. Additionally and/or alternatively, the user account can be associated with one or more platforms. The snippet packet can include the content item and a deep link. Alternatively and/or additionally, the snippet packet can include a snippet (e.g., a content item and/or a media data generated based on the content item (e.g., a graphical card and/or a summarization of the content item)), address data (e.g., a uniform resource locator and/or a uniform resource identifier), and/or metadata. The snippet packet can include location data (e.g., metadata indicative of a location of the content item within the web page, a text fragment for identifying start data and end data, one or more pointers, and/or one or more scroll position data).

In some implementations, the snippet packet may be generated by providing a graphical user interface for display. The graphical user interface can include a graphical window for displaying the web page. In some implementations, the web page can include a plurality of content items. The snippet packet generation can include obtaining selection data. The selection data can include a request to save the content item of the plurality of content items. In some implementations, the snippet packet generation can include generating the snippet packet and storing the snippet packet in a user database.

At 704, the computing system can obtain address data and location data associated with the snippet packet. The address data can be associated with a web page. The content item can be associated with the web page. Additionally and/or alternatively, the location data can be descriptive of a location of the content item within the web page.

At 706, the computing system can obtain web page data. The web page data can be obtained based at least in part on the address data (e.g., by navigating to the web page using a uniform resource locator).

At 708, the computing system can determine the location within the web page associated with the content item. The location may be determined based on a text fragment, one or more pointers, and/or via web page processing.

In some implementations, the address data can include a uniform resource locator. Additionally and/or alternatively, the location data can include one or more text fragments. Determining the location within the web page associated with the content item can then include adding the text fragments to the uniform resource locator to generate a shortcut link and inputting the shortcut link into a browser.

At 710, the computing system can provide a portion of the web page. The portion of the web page can include the location of the content item. In some implementations, providing the portion of the web page can include providing one or more indicators with the portion of the web page. The one or more indicators can indicate the content item associated with the snippet packet. In some implementations, the one or more indicators can include highlighting text associated with the content item.

Figure 8:
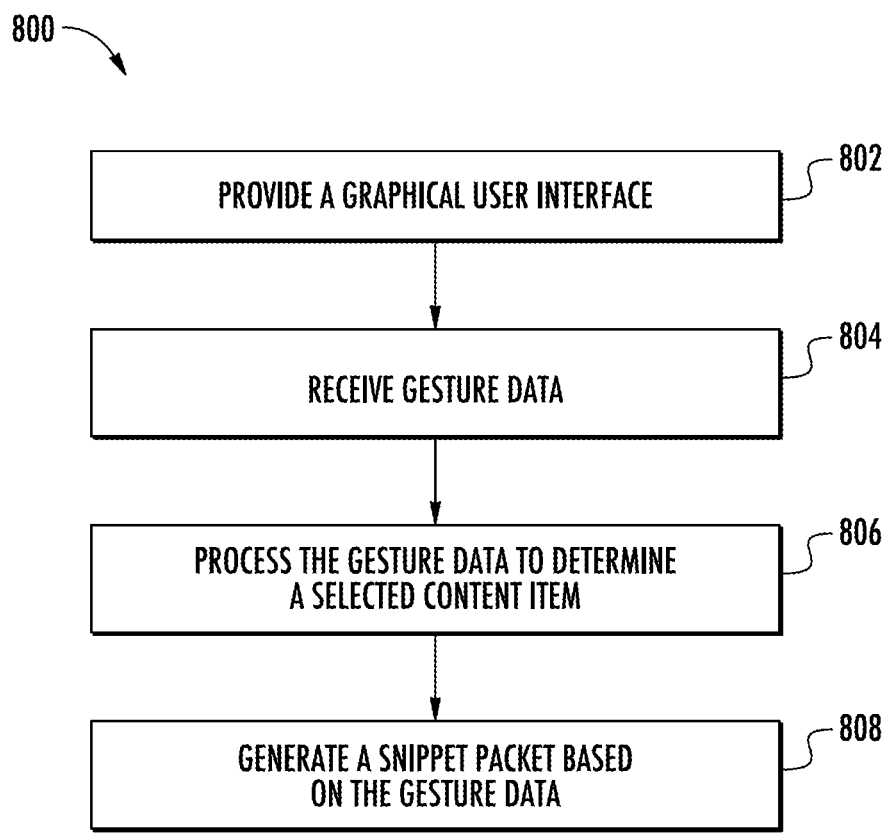
FIG. 8 depicts a flow chart diagram of an example method to perform snippet packet generation based on gesture input according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can provide a graphical user interface. The graphical user interface can include a graphical window for displaying a web page. In some implementations, the web page can include a plurality of content items.

At 804, the computing system can receive gesture data. The gesture data can be descriptive of a gesture associated with a portion of the web page. In some implementations, the gesture can include a circular gesture that encloses the portion of the web page. The gesture data can be descriptive of a touch input to a touchscreen display of a mobile computing device.

At 806, the computing system can process the gesture data to determine a selected content item. The selected content item can be associated with the portion of the web page.

In some implementations, processing the gesture data to determine the selected content item can include determining the portion of the web page enclosed by the gesture, determining a focal point of the portion, and determining the selected content item is associated with the focal point of the portion.

Alternatively and/or additionally, processing the gesture data to determine the selected content item can include processing the gestured data with a machine-learned model to determine the selected content item.

In some implementations, the selected content item can be determined based on a determined matched area associated with a rectangle determined based on the circle. The rectangle can be a rectangle of data based on syntactical make-up of the web page. In some implementations, the selected content item can be determined based on a determined word boundary and/or based on a determined media content boundary. The determination may be based on hypertext markup language code boundary. In some implementations, the source code of the web page can be parsed, and the parsed data can be processed.

Alternatively and/or additionally, the determination can include computing the area of a gesture rectangle associated with the gesture. An area of one or more content item elements can be determined. The area of intersection between the area of the gesture rectangle and each of the areas of the different content item elements can be determined. The element with the highest intersection may have the highest probability of selection and can therefore be determined as the selected content item.

At 808, the computing system can generate a snippet packet based on the gesture data. The snippet packet can include the selected content item. In some implementations, the snippet packet can include address data and location data. The address data can be associated with the web page, and the location data may be descriptive of a location of the content item within the web page.

A save interface can then be provided for display. The save interface can provide an interactive interface element that can be selected to add the snippet packet to a collection. A collection interface can then be provided. A drag input can then be received that drags a graphical representation of the snippet packet to a graphical tile descriptive of a particular collection. The snippet packet can then be stored in the collection (e.g., the snippet packet can be stored with a relationship tag that links the snippet packet to the particular collection). In some implementations, the graphical representation of the snippet packet can change sizes and/or proportions when the graphical representation is dragged to the particular collection. The size and proportion changes can provide an intuitive indication of the collection addition while providing an aesthetically pleasing display.

In some implementations, the content item can be processed to determine an entity associated with the content item. The entity can be determined by processing the content item (e.g., the text data, the image data, the audio data, the video data, the latent encoding data, and/or the link data) with a machine-learned model (e.g., an image classification model, an object classification model, a text classification model (e.g., a natural language processing model), a segmentation model, a semantics model, and/or a detection model) to generate entity data (e.g., a classification). Relationship data can then be generated and added to the snippet packet based on the entity data. The relationship data can include one or more entity tags and/or references to other related snippet packets and/or related web pages or content items.

The snippet packets can be searchable within one or more applications and/or databases. Additionally and/or alternatively, the snippet packets may be shareable via messaging applications, social media applications, and/or via another application.

In some implementations, the content item can be processed with one or more machine-learned models to generate tags that can be stored in the snippet packet. The tags can then be utilized as searchable tags to surface the snippet packet in response to a search query. The tags can be determined based on the contents of the content item (e.g., recognized words, recognized objects in an image, characteristics of a video frame or audio stream, etc.).

In some implementations, the snippet packet generation occurs after the selection of a snippet packet generation interface element, which can open a snippet packet generation interface. Alternatively and/or additionally, a user can select a content item and one or more (e.g., two) pop-ups can be provided with various options for interacting with the content item, and one of the options can include snippet packet generation. Alternatively and/or additionally, search results associated with the content item may be provided.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
   one or more processors; and
   one or more non-transitory computer-readable media that collectively store instructions that, when executed by the one or more processors, cause the computing system to perform operations, the operations comprising:
      providing data descriptive of a graphical user interface, wherein the graphical user interface comprises a graphical window for displaying a web page, wherein the web page comprises a plurality of content items;
      obtaining input data, wherein the input data comprises a request to save one or more content items of the plurality of content items;
      generating a snippet packet, wherein the snippet packet comprises:
         the one or more content items;
         address data, wherein the address data is descriptive of a web address for the web page; and
         location data, wherein the location data is descriptive of a location of the one or more content items within the web page;
      wherein generating a snippet packet comprises:
         determining an image is associated with the one or more content items;
         determining text descriptive of the one or more content items; and
         generating a graphical card, wherein the graphical card comprises the text overlaid over the image;
      storing the snippet packet, wherein the snippet packet is associated with a particular user;
      obtaining a selection of a particular sharing option of one or more sharing options; and
      transmitting the snippet packet to one or more other computing systems based on the selection of the particular sharing option, wherein the snippet packet comprises the graphical card, wherein the graphical card is selectable to automatically navigate to a location of the selected content item within the web page based on the address data and the location data.

2. The system of claim 1, wherein the operations further comprise:
   receiving a snippet request to provide a snippet interface, wherein the snippet interface comprises an interactive element associated with the snippet packet;
   providing the snippet interface for display;
   receiving an interface selection selecting the interactive element; and
   providing a portion of the web page for display, wherein the portion of the web page comprises the location of the one or more content items within the web page.

3. The system of claim 1, wherein the operations further comprise:
   receiving an insertion input, wherein the insertion input comprises a user input requesting an insertion of the one or more content items into a different interface; and
   providing the snippet packet to a third party server computing system.

4. The system of claim 1, wherein the location data comprises at least one of a scroll position, a start node, or an end node, wherein the scroll position is descriptive of the location of the one or more content items in relation to other portions of the web page, wherein the start node is descriptive of where the one or more content items begin, and wherein the end node is descriptive of where the one or more content items end.

5. The system of claim 1, wherein the one or more content items comprise at least one of an image, a video, a graphical depiction of a product, or audio.

6. The system of claim 1, wherein the operations further comprise:
   processing the one or more content items to determine an entity associated with the one or more content items;
   generating an entity tag based on the entity; and
   wherein the snippet packet comprises the entity tag.

7. The system of claim 1, wherein storing the snippet packet comprises:
   storing the snippet packet locally on a mobile computing device.

8. A computer-implemented method, the method comprising:
   obtaining, by a computing system comprising one or more processors, input data, wherein the input data is descriptive of a selection of a graphical card associated with a snippet packet, wherein the graphical card comprises text data and an image, wherein the text data is descriptive of a summary of a content item, wherein the image is associated with the content item, and wherein the graphical card comprises the summary overlaid over the image;
   obtaining, by the computing system, address data and location data associated with the snippet packet, wherein the address data is associated with a web page, wherein the content item is associated with the web page, wherein the location data is descriptive of a location of the content item within the web page;
   obtaining, by the computing system, web page data, wherein the web page data is obtained based at least in part on the address data;
   determining, by the computing system, the location within the web page associated with the content item based at least in part on the location data; and
   providing, by the computing system, a portion of the web page, wherein the portion of the web page comprises the location of the content item, wherein providing the portion of the web page comprises:
      providing the web page for display in a graphical window; and
      automatically navigating to the location within the web page associated with the content item based on the location data; and
      providing one or more indicators of the location of the content item within the web page being provided for display.

9. The method of claim 8, wherein the address data comprises a uniform resource locator, wherein the location data comprises text fragments, and wherein determining, by the computing system, the location within the web page associated with the content item comprises:
- adding, by the computing system, the text fragments to the uniform resource locator to generate a shortcut link; and
- inputting, by the computing system, the shortcut link into a browser.

10. The method of claim 8, wherein the snippet packet was generated by:
- providing, by the computing system, a graphical user interface, wherein the graphical user interface comprises the graphical window for displaying the web page, wherein the web page comprises a plurality of content items;
- obtaining, by the computing system, selection data, wherein the selection data comprises a request to save the content item of the plurality of content items;
- generating, by the computing system, the snippet packet; and
- storing, by the computing system, the snippet packet in a user database.

11. The method of claim 8, wherein the one or more indicators comprise highlighting text associated with the content item.

12. The method of claim 8, wherein the snippet packet is associated with a user account of a specific user, wherein the user account is associated with one or more platforms.

13. One or more non-transitory computer-readable media that collectively store instructions that, when executed by one or more computing devices, cause the one or more computing devices to perform operations, the operations comprising:
- providing a graphical user interface, wherein the graphical user interface comprises a graphical window for displaying a web page, wherein the web page comprises a plurality of content items;
- receiving gesture data, wherein the gesture data is descriptive of a gesture associated with a portion of the web page;
- processing the gesture data to determine a selected content item, wherein the selected content item is associated with the portion of the web page; and
- generating a snippet packet based on the gesture data, wherein the snippet packet comprises the selected content item, wherein the snippet packet comprises a graphical card associated with the selected content item, wherein the graphical card depicts data descriptive of the selected content item associated with the portion of the web page, and wherein the graphical card is selectable to automatically navigate to a location of the selected content item within the web page based on the address data and the location data, wherein the graphical card is generated by:
  - processing the selected content item to determine a topic associated with the selected content item;
  - determining an image based on the topic associated with the selected content item; and
  - generating a graphical card, wherein the graphical card comprises the image as a background, and wherein the graphical card comprises text associated with at least a subset of the selected content item overlaid over the image.

14. The one or more non-transitory computer-readable media of claim 13, wherein the snippet packet comprises address data and location data, wherein the address data is associated with the web page, and wherein the location data is descriptive of the location of the selected content item within the web page.

15. The one or more non-transitory computer-readable media of claim 13, wherein the gesture comprises a circular gesture that encloses the portion of the web page.

16. The one or more non-transitory computer-readable media of claim 13, wherein processing the gesture data to determine the selected content item comprises:
- determining the portion of the web page enclosed by the gesture;
- determining a focal point of the portion; and
- determining the selected content item is associated with the focal point of the portion.

17. The one or more non-transitory computer-readable media of claim 13, wherein processing the gesture data to determine the selected content item comprises:
- processing the gestured data with a machine-learned model to determine the selected content item.

18. The one or more non-transitory computer-readable media of claim 13, wherein the gesture data is descriptive of a touch input to a touchscreen display of a mobile computing device.

* * * * *